United States Patent
Choi et al.

(10) Patent No.: US 10,461,623 B2
(45) Date of Patent: Oct. 29, 2019

(54) VOLTAGE CONVERTER CIRCUIT, ELECTRONIC DEVICE INCLUDING THE SAME AND VOLTAGE CONVERSION METHOD

(71) Applicant: SAMSUNG ELECTRONICS CO., LTD., Suwon-si, Gyeonggi-do (KR)

(72) Inventors: Kyusik Choi, Seoul (KR); Chulwoo Park, Hwaseong-si (KR); Yunhui Han, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/984,647

(22) Filed: May 21, 2018

(65) Prior Publication Data

US 2018/0337586 A1   Nov. 22, 2018

(30) Foreign Application Priority Data

May 22, 2017   (KR) .................... 10-2017-0063094

(51) Int. Cl.
*H02M 1/00* (2006.01)
*H02M 1/088* (2006.01)
(Continued)

(52) U.S. Cl.
CPC ............... *H02M 1/00* (2013.01); *G06F 1/26* (2013.01); *H02M 1/088* (2013.01); *H02M 3/07* (2013.01);
(Continued)

(58) Field of Classification Search
CPC .. H02M 3/158; H02M 3/1588; H02M 3/1582; H02M 2001/0045;
(Continued)

(56) References Cited

U.S. PATENT DOCUMENTS

| 8,854,019 B1 | 10/2014 | Levesque et al. |
| 9,634,560 B2 * | 4/2017 | Ek ........................ H02M 3/07 |

(Continued)

FOREIGN PATENT DOCUMENTS

| JP | 2002-233139 | 8/2002 |
| JP | 2013-065939 | 4/2013 |
| KR | 10-1448130 | 10/2014 |

OTHER PUBLICATIONS

PCT International Search Report dated Aug. 22, 2018 for PCT/KR2018/005782.
(Continued)

*Primary Examiner* — Adolf D Berhane
*Assistant Examiner* — Afework S Demisse
(74) *Attorney, Agent, or Firm* — Nixon & Vanderhye P.C.

(57) ABSTRACT

The present disclosure relates to a voltage conversion circuit including: a plurality of switched capacitors; and a buck converter configured to be alternately applied with a first voltage and a second voltage output from each of two switched capacitors selected from the plurality of switched capacitors and to convert the applied first voltage or second voltage into an output voltage and to provide the output voltage. According to an embodiment, output terminals of each of the plurality of switched capacitors may be selectively electrically connected to an input terminal of the buck converter.

17 Claims, 10 Drawing Sheets

(51) Int. Cl.
  *H02M 3/07*     (2006.01)
  *G06F 1/26*     (2006.01)
  *H02M 3/155*    (2006.01)

(52) U.S. Cl.
  CPC .... *H02M 3/155* (2013.01); *H02M 2001/0054* (2013.01)

(58) Field of Classification Search
  CPC ....... H02M 2001/0067; H02M 3/1584; H02M 3/155; H02M 2003/1557; H02M 3/1563
  See application file for complete search history.

(56) References Cited

U.S. PATENT DOCUMENTS

| | | |
|---|---|---|
| 2003/0007373 A1 | 1/2003 | Satoh |
| 2009/0072800 A1 | 3/2009 | Ramadass et al. |
| 2011/0154068 A1 | 6/2011 | Huang et al. |
| 2014/0070787 A1* | 3/2014 | Arno ................. H02M 3/07 323/304 |
| 2016/0056714 A1 | 2/2016 | Ek |

OTHER PUBLICATIONS

Villar-Pique et al., "Survey and Benchmark of Fully Integrated Switching Power Converters: Switched-Capacitor Versus Inductive Approach", IEEE Transaction on Power Electronics, vol. 28, No. 9, Sep. 2013.

* cited by examiner

VOLTAGE CONVERTER CIRCUIT, ELECTRONIC DEVICE INCLUDING THE SAME AND VOLTAGE CONVERSION METHOD

CROSS-REFERENCE TO RELATED APPLICATION

This application is based on and claims priority under 35 U.S.C. § 119 to Korean Patent Application No. 10-2017-0063094, filed on May 22, 2017, in the Korean Intellectual Property Office, the disclosure of which is incorporated by reference herein in its entirety.

BACKGROUND

Field

The present disclosure relates to a voltage converter circuit capable of minimizing and/or reducing an inductance and a switching loss and increasing power conversion efficiency, an electronic device including the same, and a voltage conversion method.

Description of Related Art

An electronic device may include circuitry to convert an input voltage into an output voltage having a different value to obtain the required voltage. For example, the electronic device may include a circuit that drops a voltage to a voltage for utilizing a voltage of a battery in other components.

An example of a circuit for converting a voltage may include a switched capacitor, a buck converter and the like. For example, the switched capacitor uses a method for directly transferring energy from a capacitor to a capacitor. However, in the case of the switched capacitor, good efficiency is obtained at a predetermined optimum point, but there is a disadvantage in that it is difficult to control an output voltage and a large switching ripple occurs. In addition, in the case of the buck converter, the stable control may be performed but there is a disadvantage in that a circuit scale is increased due to a configuration of a passive element (e.g., an inductor) and a switching loss occurs due to a difference between an input voltage and an output voltage.

SUMMARY

Various embodiments of the present disclosure are directed to a voltage converter circuit capable of facilitating an output voltage control and improving voltage conversion efficiency while reducing a power lose of a circuit, an electronic device including the same, and a voltage conversion method.

Aspects of the present disclosure are not limited to those set forth above. That is, other aspects that are not mentioned may be understood by those skilled in the art to which the present disclosure pertains from the following description.

Various example embodiments of the present disclosure are directed to a voltage conversion circuit including: a plurality of switched capacitors; and a buck converter configured to be alternately applied with a first voltage and a second voltage output from each of two switched capacitors selected from the plurality of switched capacitors and to convert the applied first voltage or second voltage into an output voltage and to provide the output voltage. According to an embodiment, output terminals of each of the plurality of switched capacitors may be electrically connected to an input terminal of the buck converter selectively.

Various example embodiments of the present disclosure are directed to an electronic device including: a first switched capacitor configured to be set to generate a first voltage; a second switched capacitor configured to be set to generate a second voltage; and a converter configured to be electrically connected to the first switched capacitor and the second switched capacitor.

According to an embodiment, the converter may be set to control an output voltage of the converter using the first voltage and the second voltage.

Various example embodiments of the present disclosure are directed to a voltage conversion method of a voltage converter circuit including a plurality of switched capacitors having different voltage conversion ratios and a buck converter, the voltage conversion method of a voltage converter circuit including: converting an input voltage into a voltage having different values by each of the plurality of switched capacitors; alternately applying a first voltage and a second voltage output from each the two switched capacitors selected from the plurality of switched capacitors to the buck converter; and converting the applied first voltage or second voltage into an output voltage corresponding to a reference output voltage by the buck converter and outputting the output voltage.

According to embodiments of the disclosure, the voltage converter circuit, the electronic device including the same, and the voltage conversion method in various embodiments of the present disclosure, the switched capacitor and the buck converter can be operated at the optimum efficiency point to perform the efficient voltage conversion.

According to embodiments of the disclosure, the voltage converter circuit, the electronic device including the same, and the voltage conversion method, it is possible to reduce the size of the circuit and minimize and/or reduce the switching loss by reducing the inductance of the circuit.

According to embodiments of the disclosure, the voltage converter circuit, the electronic device including the same, and the voltage conversion method, it is possible to stably and efficiently perform the voltage conversion by providing the feedback based on the input/output voltage.

According to embodiments of the disclosure, the voltage converter circuit, the electronic device including the same, and the voltage conversion method, it is possible to easily control the output voltage while increasing the voltage conversion efficiency.

According to embodiments of the disclosure, the voltage converter circuit, the electronic device including the same, and the voltage conversion method, it is possible to reduce the switching loss, use the low voltage switch, and support the high-speed switching by reducing the voltage applied across the switch.

The aspects, features and advantages of the present disclosure that may be achieved by the various embodiments of the present disclosure are not limited to those mentioned above. That is, other aspects, features and advantages of the present disclosure that are not mentioned may be understood by those skilled in the art to which the present disclosure pertains from the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
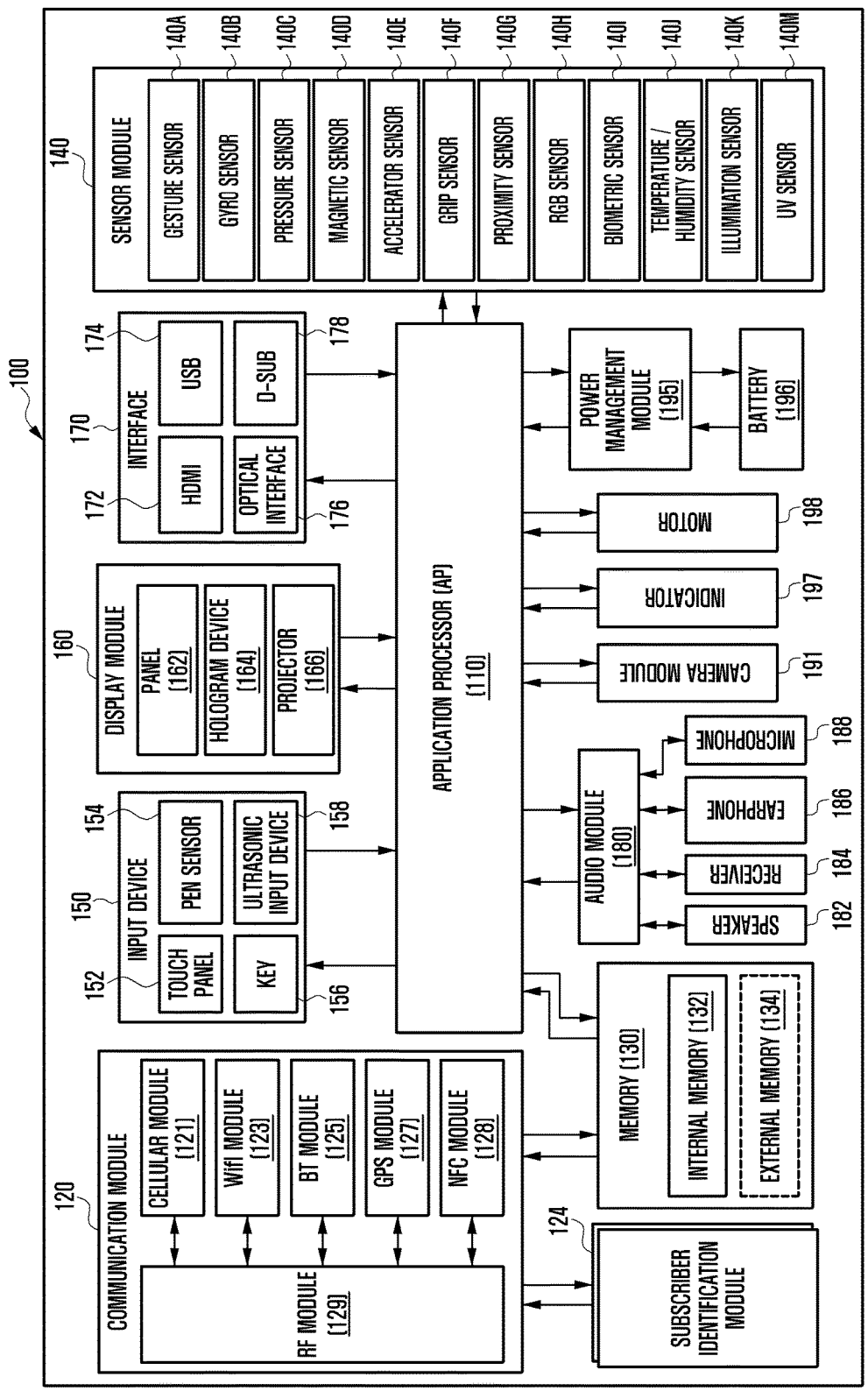
FIG. 1 is a block diagram illustrating an electronic device according to various embodiments of the present disclosure.

Hereinafter, example embodiments of the present disclosure are described in greater detail with reference to the accompanying drawings. While the present disclosure may be embodied in many different forms, specific embodiments of the present disclosure are shown in drawings and are described in detail herein, with the understanding that the present disclosure is to be considered as an example of the principles of the disclosure and is not intended to limit the disclosure to the specific embodiments illustrated. The same reference numbers are used throughout the drawings to refer to the same or like parts.

The expression "comprising" or "may comprise" used in the present disclosure indicates presence of a corresponding function, operation, or element and does not limit additional at least one function, operation, or element. Further, in the present disclosure, a term "comprise" or "have" indicates presence of a characteristic, numeral, step, operation, element, component, or combination thereof described in a specification and does not exclude presence or addition of at least one other characteristic, numeral, step, operation, element, component, or combination thereof.

In the present disclosure, an expression "or" includes any combination or the entire combination of together listed words. For example, "A or B" may include A, B, or A and B.

An expression of a first and a second in the present disclosure may be used to represent various elements of the present disclosure, but do not limit corresponding elements. For example, the expression does not limit order and/or importance of corresponding elements. The expression may be used for distinguishing one element from another element. For example, both a first user device and a second user device are user devices and represent different user devices. For example, a first element may be referred to as a second element without deviating from the scope of the present disclosure, and similarly, a second element may be referred to as a first element.

When it is described that an element is "coupled" to another element, the element may be "directly coupled" to the other element or "electrically coupled" to the other element through a third element. However, when it is described that an element is "directly coupled" to another element, no element may exist between the element and the other element.

Terms used in the present disclosure are not to limit the present disclosure but to illustrate example embodiments. When using in a description of the present disclosure and the appended claims, a singular form includes a plurality of forms unless it is explicitly differently represented.

Unless differently defined, entire terms including a technical term and a scientific term used here have the same meaning as a meaning that may be generally understood by a person of common skill in the art. It should be understood that generally using terms defined in a dictionary have a meaning corresponding to that of a context of related technology and are not analyzed as an ideal or excessively formal meaning unless explicitly defined.

In this disclosure, an electronic device may be a device that involves a communication function. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, an electronic appcessory, or a smart watch), or the like, but is not limited thereto.

According to some embodiments, an electronic device may be a smart home appliance that involves a communication function. For example, an electronic device may be a TV, a DVD (Digital Video Disk) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame, or the like, but is not limited thereto.

According to some embodiments, an electronic device may be a medical device (e.g., MRA (Magnetic Resonance Angiography), MRI (Magnetic Resonance Imaging), CT (Computed Tomography), ultrasonography, etc.), a navigation device, a GPS (Global Positioning System) receiver, an EDR (Event Data Recorder), an FDR (Flight Data Recorder), a car infotainment device, electronic equipment for ship (e.g., a marine navigation system, a gyrocompass, etc.), avionics, security equipment, or an industrial or home robot, or the like, but is not limited thereto.

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.), or the like, but is not limited thereto. An electronic device disclosed herein may be one of the above-mentioned devices or any combination thereof. As well understood by those skilled in the art, the above-mentioned electronic devices are example only and not to be considered as a limitation of this disclosure.

FIG. 1 is a block diagram illustrating an electronic device 101 in accordance with an embodiment of the present disclosure. Referring to FIG. 1, the electronic device 101 may include at least one application processor (AP) (e.g., including processing circuitry) 110, a communication module (e.g., including communication circuitry) 120, a subscriber identification module (SIM) card 124, a memory 130, a sensor module 140, an input device (e.g., including input circuitry) 150, a display 160, an interface (e.g., including interface circuitry) 170, an audio module 180, a camera module 191, a power management module 195, a battery 196, an indicator 197, and a motor 198.

The AP 110 may include various processing circuitry and drive an operating system or applications, control a plurality of hardware or software components connected thereto, and also perform processing and operation for various data including multimedia data. The AP 110 may be formed of system-on-chip (SoC), for example. According to an embodiment, the AP 110 may further include a graphic processing unit (GPU) (not shown).

The communication module 120 (e.g., the communication interface 170) may include various communication circuitry and perform a data communication with any other electronic device (e.g., the electronic device 104 or the server 106) connected to the electronic device 100 (e.g., the electronic device 101) through the network. According to an embodiment, the communication module 120 may include therein various communication circuitry included in various modules, such as, for example, and without limitation, a cellular module 121, a WiFi module 323, a BT module 125, a GPS module 127, an NFC module 128, and an RF (Radio Frequency) module 129.

The cellular module 121 may offer a voice call, a video call, a message service, an internet service, or the like through a communication network (e.g., LTE, LTE-A, CDMA, WCDMA, UMTS, WiBro, or GSM, etc.). Additionally, the cellular module 121 may perform identification and authentication of the electronic device in the communication network, using the SIM card 124. According to an embodiment, the cellular module 121 may perform at least part of functions the AP 110 can provide. For example, the cellular module 121 may perform at least part of a multimedia control function.

According to an embodiment, the cellular module 121 may include a communication processor (CP). Additionally, the cellular module 121 may be formed of SoC, for example. Although some elements such as the cellular module 121 (e.g., the CP), the memory 130, or the power management module 195 are shown as separate elements being different from the AP 110 in FIG. 3, the AP 110 may be formed to have at least part (e.g., the cellular module 321) of the above elements in an embodiment.

According to an embodiment, the AP 110 or the cellular module 121 (e.g., the CP) may load commands or data, received from a nonvolatile memory connected thereto or from at least one of the other elements, into a volatile memory to process them. Additionally, the AP 110 or the cellular module 121 may store data, received from or created at one or more of the other elements, in the nonvolatile memory.

Each of the WiFi module 123, the BT module 125, the GPS module 127 and the NFC module 128 may include a processor for processing data transmitted or received therethrough. Although FIG. 1 shows the cellular module 121, the WiFi module 123, the BT module 125, the GPS module 127 and the NFC module 128 as different blocks, at least part of them may be contained in a single IC (Integrated Circuit) chip or a single IC package in an embodiment. For example, at least part (e.g., the CP corresponding to the cellular module 121 and a WiFi processor corresponding to the WiFi module 123) of respective processors corresponding to the cellular module 121, the WiFi module 123, the BT module 125, the GPS module 127 and the NFC module 128 may be formed as a single SoC.

Figure 3:
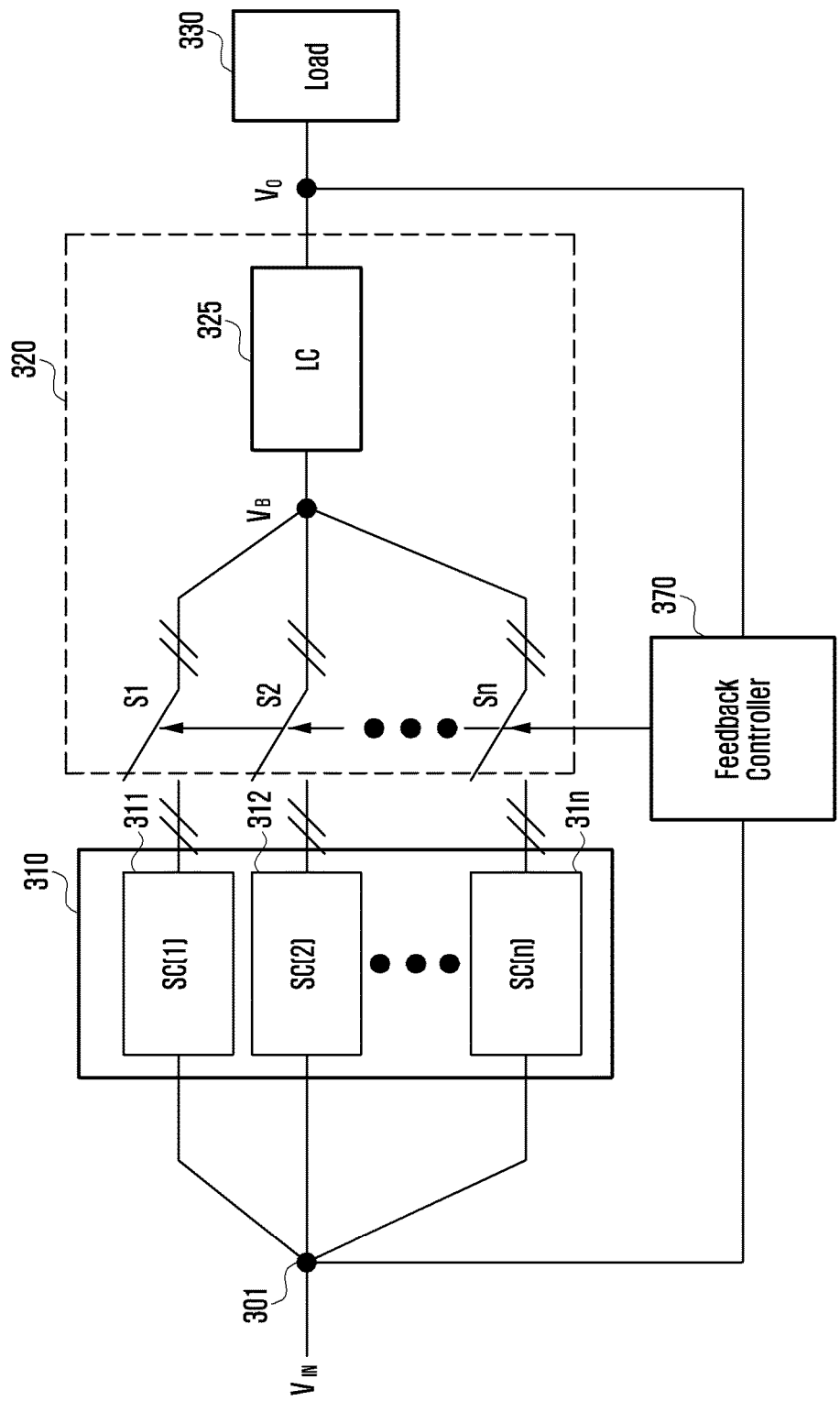
FIG. 3 is a diagram illustrating a voltage converter circuit according to various embodiments of the present disclosure.

The RF module 129 may transmit and receive data, e.g., RF signals or any other electric signals. Although not shown, the RF module 129 may include a transceiver, a PAM (Power Amp Module), a frequency filter, an LNA (Low Noise Amplifier), or the like. Also, the RF module 129 may include any component, e.g., a wire or a conductor, for transmission of electromagnetic waves in a free air space. Although FIG. 3 shows that the cellular module 121, the WiFi module 123, the BT module 125, the GPS module 127 and the NFC module 128 share the RF module 129, at least one of them may perform transmission and reception of RF signals through a separate RF module in an embodiment.

The SIM card 124 may be a specific card formed of SIM and may be inserted into a slot formed at a certain place of the electronic device 101. The SIM card 124 may contain therein an ICCID (Integrated Circuit Card IDentifier) or an IMSI (International Mobile Subscriber Identity).

The memory 130 (e.g., the memory 130) may include an internal memory 132 and/or an external memory 134. The internal memory 132 may include, for example, at least one of a volatile memory (e.g., DRAM (Dynamic RAM), SRAM (Static RAM), SDRAM (Synchronous DRAM), etc.) or a nonvolatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, etc.).

According to an embodiment, the internal memory 132 may have the form of an SSD (Solid State Drive). The external memory 134 may include a flash drive, e.g., CF (Compact Flash), SD (Secure Digital), Micro-SD (Micro Secure Digital), Mini-SD (Mini Secure Digital), xD (eXtreme Digital), memory stick, or the like. The external memory 334 may be functionally connected to the electronic device 101 through various interfaces. According to an embodiment, the electronic device 301 may further include a storage device or medium such as a hard drive.

The sensor module 140 may measure physical quantity or sense an operating status of the electronic device 101, and then convert measured or sensed information into electrical signals. The sensor module 140 may include, for example, at least one of a gesture sensor 140A, a gyro sensor 140B, an atmospheric (e.g., pressure) sensor 140C, a magnetic sensor 140D, an acceleration sensor 140E, a grip sensor 140F, a proximity sensor 140G, a color sensor 140H (e.g., RGB (Red, Green, Blue) sensor), a biometric sensor 140I, a temperature-humidity sensor 140J, an illumination sensor 140K, and a UV (ultraviolet) sensor 140M. Additionally or alternatively, the sensor module 140 may include, e.g., an E-nose sensor (not shown), an EMG (electromyography) sensor (not shown), an EEG (electroencephalogram) sensor (not shown), an ECG (electrocardiogram) sensor (not shown), an IR (infrared) sensor (not shown), an iris scan sensor (not shown), or a finger scan sensor (not shown). Also, the sensor module 140 may include a control circuit for controlling one or more sensors equipped therein.

The input device 150 may include various input circuitry, such as, for example, and without limitation, a touch panel 152, a digital pen sensor 154, a key 156, and/or an ultrasonic input unit 158, or the like. The touch panel 152 may recognize a touch input in a manner of capacitive type, resistive type, infrared type, or ultrasonic type. Also, the touch panel 152 may further include a control circuit. In case of a capacitive type, a physical contact or proximity may be recognized. The touch panel 152 may further include a tactile layer. In this case, the touch panel 152 may offer a tactile feedback to a user.

The digital pen sensor 154 may be formed in the same or similar manner as receiving a touch input or by using a separate recognition sheet. The key 156 may include, for example, a physical button, an optical key, or a keypad. The ultrasonic input unit 158 is a specific device capable of identifying data by sensing sound waves with a microphone 188 in the electronic device 101 through an input tool that generates ultrasonic signals, thus allowing wireless recognition. According to an embodiment, the electronic device 101 may receive a user input from any external device (e.g., a computer or a server) connected thereto through the communication module 120.

The display 160 (e.g., the display 150) may include a panel 162, a hologram 164, or a projector 166. The panel 162 may be, for example, LCD (Liquid Crystal Display), AM-OLED (Active Matrix Organic Light Emitting Diode), or the like. The panel 162 may have a flexible, transparent or wearable form. The panel 162 may be formed of a single module with the touch panel 152. The hologram 164 may show a stereoscopic image in the air using interference of light. The projector 166 may project an image onto a screen, which may be located at the inside or outside of the electronic device 101. According to an embodiment, the display 160 may further include a control circuit for controlling the panel 162, the hologram 164, and the projector 166.

The interface 170 may include various interface circuitry, such as, for example, and without limitation, an HDMI (High-Definition Multimedia Interface) 172, a USB (Universal Serial Bus) 174, an optical interface 176, and/or a D-sub (D-subminiature) 178, or the like. Additionally or alternatively, the interface 170 may include, for example, an MHL (Mobile High-definition Link) interface, an SD (Secure Digital) card/MMC (Multi-Media Card) interface, or an IrDA (Infrared Data Association) interface.

The audio module 180 may perform a conversion between sounds and electrical signals. The audio module 180 may process sound information inputted or outputted through a speaker 182, a receiver 184, an earphone 186, or a microphone 188.

The camera module 191 is a device capable of obtaining still images and moving images. According to an embodiment, the camera module 191 may include at least one image sensor (e.g., a front sensor or a rear sensor), a lens (not shown), an ISP (Image Signal Processor, not shown), or a flash (e.g., LED or xenon lamp, not shown).

The power management module 195 may manage electric power of the electronic device 101. Although not shown, the power management module 195 may include, for example, a PMIC (Power Management Integrated Circuit), a charger IC, or a battery or fuel gauge.

The PMIC may be formed, for example, of an IC chip or SoC. Charging may be performed in a wired or wireless manner. The charger IC may charge a battery 196 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 196 and a voltage, current or temperature in a charging process. The battery 196 may store or create electric power therein and supply electric power to the electronic device 101. The battery 196 may be, for example, a rechargeable battery or a solar battery.

The indicator 197 may show thereon a current status (e.g., a booting status, a message status, or a recharging status) of the electronic device 101 or of its part (e.g., the AP 110). The motor 198 may convert an electric signal into a mechanical vibration. Although not shown, the electronic device 301 may include a specific processor (e.g., GPU) for supporting a mobile TV. This processor may process media data that comply with standards of DMB (Digital Multimedia Broadcasting), DVB (Digital Video Broadcasting), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

Figure 2A:
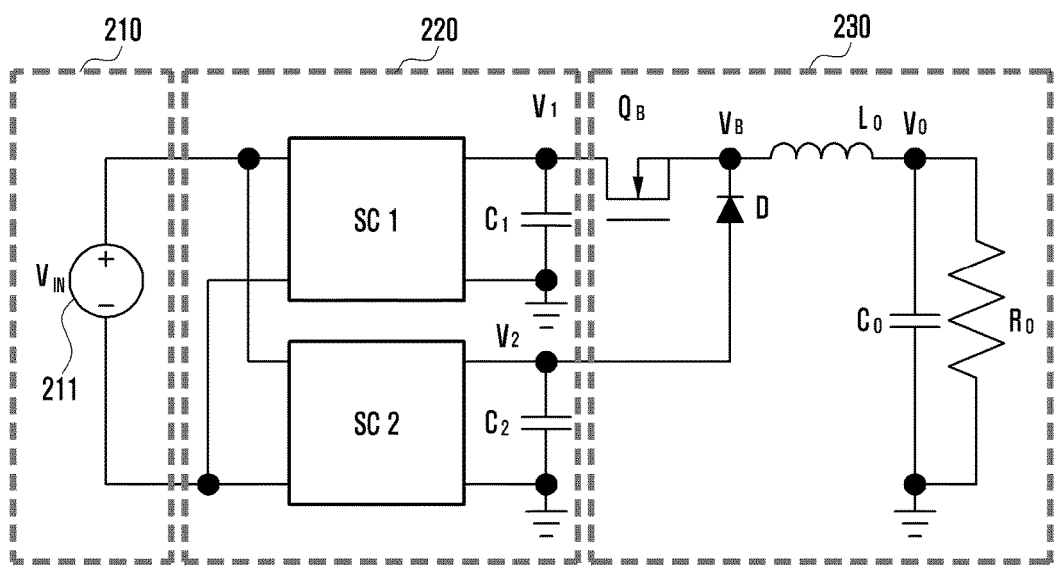
FIGS. 2A and 2B are diagrams illustrating a voltage converter circuit according to various embodiments of the present disclosure.
Figure 2B:
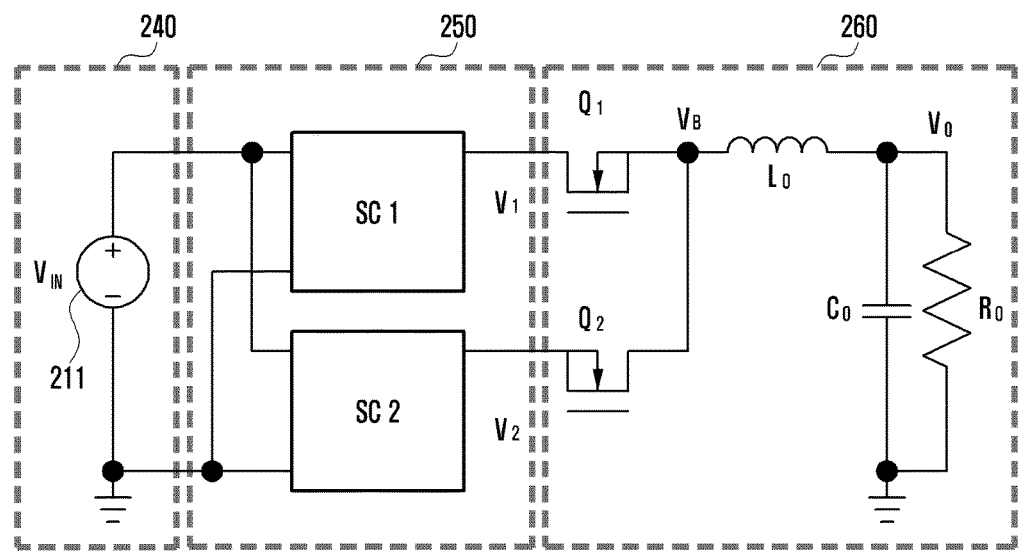

FIGS. 2A and 2B are diagrams illustrating a voltage converter circuit according to various embodiments of the present disclosure.

Referring to FIG. 2A, the voltage converter circuit according to an embodiment of the present disclosure may include a power input 210, a plurality of switched capacitors 220, and a buck converter 230. According to an embodiment, the power input 210, the plurality of switched capacitors 220, and the buck converter 230 may be sequentially connected to each other. For example, the plurality of switched capacitors 220 may be connected to the power input 210. Each of the switched capacitors SC1 and SC2 may be connected to the buck converter 230. A load $R_O$ may be connected to an output terminal of the buck converter 230.

According to an embodiment, the power input 210 may provide an input voltage to each of the plurality of switched capacitors SC1 and SC2. For example, the power input 210 may supply (apply) an input voltage to the first switched capacitor SC1 and the second switched capacitor SC2. For example, the power input 210 may include a power supply 211. For example, the power supply 211 may include, for example, and without limitation, a battery of an electronic device.

According to an embodiment, the input voltage may be applied to each of the switched capacitors SC1 and SC2. According to an embodiment, each of the switched capacitors SC1 and SC2 may output voltages $V_1$ and $V_2$ that are obtained by converting the input voltage. According to an embodiment, each of the switched capacitors SC1 and SC2 may have different voltage conversion ratios. For example, each of the switched capacitors SC1 and SC2 may include a plurality of capacitors, and a voltage conversion ratio having optimum efficiency may be set based on the configuration. According to an embodiment, each of the plurality of switched capacitors SC1 and SC2 may drop the input voltage depending on the voltage conversion ratio to output the first voltage $V_1$ and the second voltage $V_2$. According to an embodiment, each of the switched capacitors SC1 and SC2 may be applied with the same input voltage and may output the first voltage $V_1$ and the second voltage $V_2$, respectively, which may be different depending on each of the voltage conversion ratios. For example, the first switched capacitor SC1 may have a voltage conversion ratio of 2:1, and the second switched capacitor SC2 may have a voltage conversion ratio of 3:1. In this case, if the input voltage is 5V, the first switched capacitor SC1 may output the first voltage $V_1$ of 2.5V, and the second switched capacitor SC2 may output the second voltage $V_2$ of 5/3V (about 1.67V).

According to an embodiment, the voltages $V_1$ and $V_2$ output from each of the switched capacitors SC1 and SC2 may have a value greater than a ground. For example, each of the switched capacitors SC1 and SC2 may drop the input voltage having a positive value depending on each voltage conversion ratio to output each of the first voltage $V_1$ and the second voltage $V_2$, such that the first voltage $V_1$ and the second voltage $V_2$ may have the value greater than the ground.

According to an embodiment, the first voltage $V_1$ and the second voltage $V_2$ output from each of the first switched capacitor SC1 and the second switched capacitor SC2 may be within a set range from a preset reference output voltage. For example, the reference output voltage may be an output voltage value of the voltage converter circuit required by the system (e.g., an electronic device). For example, if the reference output voltage required by the electronic device is 1V, the first voltage $V_1$ output from the first switched capacitor SC1 may be 1.3V and the second voltage $V_2$ output from the second switched capacitor SC2 may be 0.7V. According to an embodiment, the first switched capacitor SC1 and the second switched capacitor SC2 may be configured to have the voltage conversion ratio capable of outputting the voltage within the set range from the reference output voltage according to the set reference output voltage.

According to an embodiment, one of the first switched capacitor SC1 and the second switched capacitor SC2 may be configured to output the first voltage $V_1$ which is greater than the set reference output voltage, and the other one of the first switched capacitor SC1 and the second switched capacitor SC2 may be configured to output the second voltage $V_2$ which is less than the set reference output voltage. For example, the first switched capacitor SC1 may be configured to provide (apply) the first voltage $V_1$, which is a value greater than the reference output voltage, as a high side input of the buck converter 230, and the second switched capacitor SC2 may be configured to provide (apply) the second voltage $V_2$, which is a value less than the reference output voltage, as a low side input of the buck converter.

According to an embodiment, capacitors $C_1$ and $C_2$ for holding the voltages $V_1$ and $V_2$ output from each of the switched capacitors SC1 and SC2 may be connected to the output terminals of the switched capacitors SC1 and SC2, respectively. For example, the first capacitor $C_1$ may be connected to the output terminal of the first switched capacitor SC1, and the second capacitor $C_2$ may be connected to the output terminal of the second switched capacitor SC2. For example, the first capacitor $C_1$ may hold the first voltage $V_1$ output from the first switched capacitor SC1, and the second capacitor $C_2$ may hold the second voltage $V_2$ output from the second switched capacitor SC2.

According to an embodiment, the buck converter 230 may include a plurality of switch elements $Q_B$ and D, an inductor $L_O$, and a capacitor $C_O$. For example, the buck converter 230 may include a transistor switch $Q_B$ and a diode D. According to an embodiment, the load $R_O$ may be connected to the capacitor $C_O$ terminal of the buck converter 230.

According to an embodiment, the buck converter 230 and the buck converter 260 (see, e.g., FIG. 2B) receive the first voltage $V_1$ or the second voltage $V_2$ alternately applied from the switched capacitors SC1 and SC2, respectively, as an input voltage $V_B$ and convert the received voltage into an output voltage $V_O$ through an LC filter and provide the output voltage $V_O$. According to an embodiment, the buck converter 230 may convert the first voltage $V_1$ or the second voltage $V_2$ into the output voltage $V_O$ corresponding to the reference output voltage based on the set reference output voltage and output the output voltage $V_O$. For example, if the reference output voltage (or reference input/output voltage ratio) that the system (e.g., electronic device) requires is set, the buck converter 230 may convert the applied first voltage $V_1$ or second voltage $V_2$ into the output voltage $V_O$ corresponding to the reference output voltage and provide the output voltage $V_O$. For example, if the set reference output voltage is 1.5V, the buck converter 230 may convert the first voltage $V_1$ or the second voltage $V_2$ alternately received by the input terminal ($V_B$ point) into a voltage of 1.5V through the LC filters $L_O$ and $C_O$ and output the voltage of 1.5V.

According to an embodiment, the buck converter 230 may be alternately applied with the first voltage $V_1$ and the second voltage $V_2$ from the two switched capacitors SC1 and SC2. For example, the first voltage $V_1$ output from the first switched capacitor SC1 and the second voltage $V_2$ output from the second switched capacitor SC2 may be alternately applied to the buck converter 230. For example, the first voltage $V_1$ or the second voltage $V_2$ output from the switched capacitors SC1 and SC2, respectively, may correspond to the voltage $V_B$ of the input terminals of the LC filters $L_O$ and $C_O$ of the buck converter 230. In the case of the buck converter 230, as the difference between the voltage $V_B$ of the input terminals and the voltage $V_O$ of the output terminals of the LC filters $L_O$ and $C_O$ is reduced, the inductance may be reduced and the size of the inductor $L_O$ may be reduced. For example, if the difference between the voltage $V_B$ of the input terminal and the voltage $V_O$ of the output terminal is small, the inductance satisfying the same ripple specification may be reduced and the size of the inductor $L_O$ may be reduced. For example, as the difference between the voltage $V_B$ of the input terminal and the voltage $V_O$ of the output terminal of the LC filter of the buck converter 230 is reduced, the switching loss generated from the switches $Q_B$ and D of the buck converter 230 may be reduced and the high-speed switching may be possible. The inductance may be further reduced in the case of the high-speed switching. According to various embodiments of the present disclosure, the switched capacitors 220 may alternately apply the first voltage $V_1$ and the second voltage $V_2$ having a slight difference from the reference output voltage above the ground to the voltage $V_B$ of the input terminals of the LC filters $L_O$ and $C_O$ of the buck converter 230, thereby reducing the inductor $L_O$ and the switching loss. For example, if the set reference output voltage is 1V, the first voltage $V_1$ received from the first switched capacitor SC1 may be 1.3V and the second voltage $V_2$ received from the second switched capacitor SC2 may be 0.7V. In this case, the voltage difference between the input and output terminals of the LC filters $L_O$ and $C_O$ of the buck converter 230 may be approximately ±0.3V. On the other hand, for example, in the case where the buck converter is connected to a single switched capacitor (or in the case of a common single buck converter) in series, the input terminal of the buck converter may be alternately applied with the input voltage or the voltage output from the single switched capacitor and the ground voltage 0V. For example, if the ground voltage is the voltage $V_B$ of the input terminals of the LC filters $L_O$ and $C_O$ of the buck converter 230, the voltage difference between the input terminals and the output terminals of the LC filters $L_O$ and $C_O$ of the buck converter 230 may be 1V. According to various embodiments of the present disclosure, the first voltage $V_1$ and the second voltage $V_2$ output from each of the two switched capacitors are alternately applied to the input terminals of the LC filters $L_O$ and $C_O$ of the buck converter 230, thereby reducing the voltage difference between the input terminal and the output terminal of the LC filters $L_O$ and $C_O$ of the buck converter 230 and reducing the inductance. In addition, it is possible to reduce the switching loss by reducing the voltage applied to the switch of the buck converter 230.

Referring to FIG. 2B, the voltage converter circuit according to an embodiment of the present disclosure may include a power input 240, a plurality of switched capacitors 250, and a buck converter 260. According to an embodiment, the power input 240, the plurality of switched capacitors 250, and the buck converter 260 may be sequentially connected to each other. For example, the plurality of switched capacitors 250 may be connected to the power input 240. Each of the switched capacitors SC1 and SC2 may be connected to the buck converter 260. A load $R_O$ may be connected to an output terminal of the buck converter 260.

According to an embodiment, the power input 240 may provide an input voltage to each of the plurality of switched capacitors SC1 and SC2. For example, the power input unit 240 may supply (apply) an input voltage to the first switched capacitor SC1 and the second switched capacitor SC2. For example, the power input 240 may include a power supply 211. For example, the power supply 211 may include, for example, and without limitation, a battery of an electronic device.

According to an embodiment, the input voltage may be applied to each of the switched capacitors SC1 and SC2. According to an embodiment, each of the switched capacitors SC1 and SC2 may output voltages $V_1$ and $V_2$, respectively that may be obtained by converting the input voltage. According to an embodiment, each of the switched capacitors SC1 and SC2 may have different voltage conversion ratios. For example, each of the switched capacitors SC1 and SC2 may include a plurality of capacitors, and a voltage conversion ratio having optimum efficiency may be set based on the configuration. According to an embodiment, each of the plurality of switched capacitors SC1 and SC2 may drop the input voltage depending on the voltage conversion ratio to output the first voltage $V_1$ and the second voltage $V_2$. According to an embodiment, each of the switched capacitors SC1 and SC2 may be applied with the same input voltage and may output the first voltage $V_1$ and the second voltage $V_2$ which are different depending on each of the voltage conversion ratios. According to an embodiment, the voltages $V_1$ and $V_2$ output from each of the switched capacitors SC1 and SC2 may have a value greater than a ground.

According to an embodiment, the first voltage $V_1$ and the second voltage $V_2$ output from each of the first switched capacitor SC1 and the second switched capacitor SC2 may be within a set range from a preset reference output voltage. For example, the reference output voltage may be an output voltage value of the voltage converter circuit required by the system (e.g., an electronic device). According to an embodiment, the first switched capacitor SC1 and the second switched capacitor SC2 may be configured to have a voltage conversion ratio capable of outputting the voltage within the set range from the reference output voltage depending on the set reference output voltage.

According to an embodiment, one of the first switched capacitor SC1 and the second switched capacitor SC2 may be configured to output the first voltage $V_1$ which is greater than the set reference output voltage, and the other one of the first switched capacitor SC1 and the second switched capacitor SC2 may be configured to output the second voltage $V_2$ which is less than the set reference output voltage. For example, the first switched capacitor SC1 may be configured to provide (apply) the first voltage $V_1$, which is a value greater than the reference output voltage, as a high side input of the buck converter 230, and the second switched capacitor SC2 may be configured to provide (apply) the second voltage $V_2$, which is a value less than the reference output voltage, as a low side input of the buck converter.

According to an embodiment, separate output terminal capacitors (e.g., $C_1$ and $C_2$ in FIG. 2A) may be omitted at the output terminals of each of the switched capacitors SC1 and SC2. For example, the capacitors included in each of the switched capacitors SC1 and SC2 may replace a role (function) of the capacitors $C_1$ and $C_2$ of the output terminals of the switched capacitors SC1 and SC2 of FIG. 2A.

According to an embodiment, the buck converter 260 may include a plurality of switch elements $Q_1$ and $Q_2$, an inductor $L_O$, and a capacitor $C_O$. For example, the buck converter 260 may include a plurality of transistor switches $Q_1$ and $Q_2$. For example, each of the switch elements $Q_B$ and D of the buck converter 230 of FIG. 2A may be replaced with the transistor switches $Q_1$ and $Q_2$ to be configured like the buck converter 260. According to an embodiment, the load $R_O$ may be connected to the capacitor $C_O$ terminal of the buck converter 260.

According to an embodiment, the buck converter 260 receive the first voltage $V_1$ or the second voltage $V_2$ alternately applied from the switched capacitors SC1 and SC2, respectively, as an input voltage $V_B$ and convert the received voltage into an output voltage $V_O$ through an LC filter and provide the output voltage $V_O$. According to an embodiment, the buck converter 260 may convert the first voltage $V_1$ or the second voltage $V_2$ into the output voltage $V_O$ corresponding to the reference output voltage according to the set reference output voltage and output the output voltage $V_O$. For example, if the reference output voltage (or reference input/output voltage ratio) that the system wants is set, the buck converter 260 may convert the applied first voltage $V_1$ or second voltage $V_2$ into the output voltage $V_O$ corresponding to the reference output voltage and provide the output voltage $V_O$.

According to an embodiment, the buck converter 260 may be alternately applied with the first voltage $V_1$ and the second voltage $V_2$ from the two switched capacitors SC1 and SC2. For example, the first voltage $V_1$ output from the first switched capacitor SC1 and the second voltage $V_2$ output from the second switched capacitor SC2 may be alternately applied to the buck converter 260. For example, the first voltage $V_1$ or the second voltage $V_2$ output from the switched capacitors SC1 and SC2, respectively, may correspond to the voltage $V_B$ of the input terminals of the LC filters $L_O$ and $C_O$ of the buck converter 260. For example, in the case of the buck converter 260, as the difference between the voltage $V_B$ of the input terminals and the voltage $V_O$ of the output terminals of the LC filters $L_O$ and $C_O$ is reduced, the inductance may be reduced and the size of the inductor $L_O$ may be reduced. For example, as the difference between the voltage $V_B$ of the input terminals and the voltage $V_O$ of the output terminals of the LC filters $L_O$ and $C_O$ of the buck converter 260 is reduced, the switching loss generated from the buck converter 260 and the switches $Q_1$ and $Q_2$ of the buck converter 260 may be reduced and the high-speed switching may be possible. For example, when the high-speed switching is performed, the inductance of the buck converter 260 may be additionally reduced. According to various embodiments of the present disclosure, the switched capacitors 250 may alternately apply the first voltage $V_1$ and the second voltage $V_2$ having a slight difference from the reference output voltage above the ground to the buck converter 260 and the voltage $V_B$ of the input terminals of the LC filters $L_O$ and $C_O$ of the buck converter 260, thereby reducing the inductor $L_O$ and the switching loss.

For example, if the single switched capacitor and buck converters 230 and 260 are simply connected in series, or multiple voltages are to be output from a plurality of capacitors in the single switched capacitor, a number of switch elements are needed, or the switched capacitor and the buck converter need to be synchronized for operation. For example, the switched capacitor and the buck converter have different optimal efficiency points, but when the operations of the switched capacitor and the buck converter need to be synchronized, the efficiency of at least one of the switched capacitor and the buck converter may be lowered and the whole voltage conversion efficiency may be lowered.

According to various embodiments of the present disclosure, as the voltages are sequentially converted using the two switched capacitors SC1 and SC2 and the buck converters 230 and 260, the voltage converter circuit may be configured of a relatively small number of switches. Each of the switched capacitors SC1 and SC2 and the buck converters 230 and 260 may be independently operated at the optimum efficiency point (e.g., optimum switching frequency) without matching the switching synchronization between the switched capacitors SC1 and SC2 and the buck converters 230 and 260, thereby maximizing the overall voltage conversion efficiency.

FIG. 3 is a diagram illustrating a voltage converter circuit according to various embodiments of the present disclosure.

The voltage converter circuit according to an embodiment of the present disclosure may include a power input terminal 301, a plurality of switched capacitors 310 (e.g., including first switched capacitor 311, second switched capacitor 312, ... n-th switched capacitor 31n), a converter 320, and a feedback controller 370. According to an embodiment, the converter 320 may include a buck converter. According to an embodiment, the power input terminal 301, the plurality of switched capacitors 310 (e.g., first switched capacitor 311, second switched capacitor 312, ..., n-th switched capacitor 31n), and a buck converter 320 may be sequentially connected. For example, the plurality of switched capacitors 310 may be each connected to the power input terminal 301. The switched capacitors may each be connected to the converter (e.g., buck converter) 320. According to an embodiment, the converter 320 may include a plurality of switching elements S1, S2, ..., Sn and an LC circuit 325 (e.g., an LC filter). According to an embodiment, a load 330 may be connected to an output terminal of the buck converter 320. According to an embodiment, the feedback controller 370 may be electrically connected to the output terminal of the buck converter 320, the power input terminal 301, or the switching elements S1, S2, ..., Sn.

According to an embodiment, the power input terminal 301 may apply an input voltage $V_{IN}$ to the plurality of switched capacitors 310 (e.g., first switched capacitor 311, second switched capacitor 312, ..., n-th switched capacitor 31n). For example, the power input terminal 301 may be connected to a battery of an electronic device. For example, the power input terminal 301 may apply the input voltage $V_{IN}$ supplied from the battery of the electronic device to the plurality of switched capacitors 310.

According to an embodiment, the input voltage $V_{IN}$ may be applied to each of the switched capacitors 311, 312, ... , 31n. For example, the input voltage $V_{IN}$ (e.g., the output voltage $V_O$ of the battery) may be applied to each of the switched capacitors 311, 312, ..., 31n through the power input terminal 301. According to an embodiment, each of the switched capacitors 311, 312, ..., 31n may convert the input voltage $V_{IN}$ and output a voltage having different values. According to an embodiment, each of the switched capacitors 311, 312, ..., 31n may have different voltage conversion ratios. For example, each of the switched capacitors 311, 312, ..., 31n may include a plurality of capacitors, and a voltage conversion ratio having optimum efficiency may be set based on the configuration. According to an embodiment, the same input voltage $V_{IN}$ may be applied to each of the switched capacitors 311, 312, ..., 31n, and different voltages may be output depending on each voltage conversion ratio. According to an embodiment, the voltages that each of the switched capacitors 311, 312, ..., 31n converts may have a value greater than the ground. For example, the voltage output from each of the switched capacitors 311, 312, ..., 31n may be applied as the voltage $V_B$ (e.g., voltage of the input terminal of the LC circuit 325) of the input terminal of the buck converter 320 according to the connection of the switching elements S1, S2, ..., Sn.

According to an embodiment, the feedback controller 370 may select the two switched capacitors, which apply a voltage to the buck converter 320, from among the plurality of switched capacitors 310. For example, the feedback controller 370 may select the two switched capacitors which alternately apply a voltage to the buck converter 320. According to an embodiment, when the finally required reference output voltage is set in the voltage converter circuit, the feedback controller 370 may select the two switched capacitors so that the voltage difference (e.g., the voltage difference between $V_B$ and $V_O$) applied across the buck converter 320 can be minimized and/or reduced.

According to an embodiment, the feedback controller 370 may measure the input voltage $V_{IN}$. For example, the feedback controller 370 may measure the voltage of the power input terminal 301. According to an embodiment, the feedback controller 370 may select the two switched capacitors based on the input voltage $V_{IN}$ and the voltage conversion ratios of each of the plurality of switched capacitors 311, 312, ..., 31n. According to an embodiment, the feedback controller 370 may select one switched capacitor, which outputs a primary conversion voltage having a slightest difference from the reference output voltage (or output voltage $V_O$), among the switched capacitors outputting a voltage greater than the set reference output voltage (or output voltage $V_O$) based on the input voltage $V_{IN}$ and the voltage conversion ratio, and one switched capacitor, which outputs a primary conversion voltage having the slightest difference from the reference output voltage (or output voltage $V_O$), among the switched capacitors outputting the primary conversion voltage less than the reference output voltage (or output voltage $V_O$). For example, each of the plurality of switched capacitors 311, 312, ..., 31n may output different primary conversion voltages depending on the voltage conversion ratio. The feedback controller 370 may select the two switched capacitors outputting the primary conversion voltage having the slightest difference from the reference output voltage based on the input voltage $V_{IN}$ and the voltage conversion ratio to minimize and/or reduce the voltage difference applied across the buck converter 320. For example, the feedback controller 370 may select the two switched capacitors outputting a voltage within a set range from the reference output voltage (or output voltage $V_O$).

According to an embodiment, the feedback controller 370 may select the two switched capacitors based on a predetermined table depending on the input voltage $V_{IN}$ and the voltage conversion ratio. For example, the predetermined table may be a table in which the information on the voltage conversion ratio at the optimum efficiency point for each of the plurality of capacitors 311, 312, ..., 31n is mapped. For example, the feedback controller 370 may determine the primary conversion voltage output from each of the switched capacitors 311, 312, ..., 31n for the input voltage $V_{IN}$, based on the predetermined table. For example, each of the plurality of switched capacitors 311, 312, ..., 31n of the present disclosure may convert the applied input voltage based on the fixed voltage conversion ratio at the optimum efficiency point to output voltages having different values. The feedback controller 370 may determine the switched capacitor having the optimum efficiency (e.g., voltage conversion ratio capable of outputting the voltage having the slightest difference from the reference output voltage) based on the value of the input voltage VIN based on the table, and select one switched capacitor outputting a voltage greater than the reference output voltage and one switched capacitor outputting a voltage smaller than the reference output voltage.

According to an embodiment, the feedback controller 370 may adaptively select the two switched capacitors according to the set condition based on the input voltage $V_{IN}$ and the voltage conversion ratios of each of the plurality of switched capacitors 311, 312, ..., 31n. For example, if it is assumed that the voltage conversion ratios of each of the first switched capacitor 311, the second switched capacitor 312, ..., and the n-th switched capacitor 31n are M(1), M(2), ..., M(n), the reference output voltage is Vo_ref, and the input voltage VIN is $V_{in}$, the feedback controller 370 may select a k-th switched capacitor and a k+1-th switched capacitor which satisfy a condition of M(k)<(Vo_ref/$V_{in}$)<M(k+1) (k=1, 2, ..., n−1). For example, the feedback controller 370 may select the k-th switched capacitor and the k+1-th switched capacitor which satisfy a condition of $V_{in}$*M(k)<Vo_ref<$V_{in}$*M (k+1). According to an embodiment, since the output reference voltage Vo_ref is a voltage value to be ultimately obtained through the voltage conversion in the actual voltage converter circuit, the feedback controller 370 may measure the actual output voltage $V_O$ to select the two switched capacitors according to the above condition.

According to an embodiment, the feedback controller 370 may measure the output voltage $V_O$. According to an embodiment, the feedback controller 370 may select the two switched capacitors that apply the primary conversion voltage to the buck converter 320 based on the difference between the output voltage $V_O$ and the reference output voltage. For example, the feedback controller 370 may determine whether the output voltage $V_O$ holds the reference output voltage (e.g., the desired output voltage). For example, the feedback controller 370 may determine whether the output voltage $V_O$ holds the reference output voltage or holds a predetermined error range in the reference output voltage. For example, when the selected switched capacitor is not suitable, an error occurs in the output voltage $V_O$, and therefore the output voltage $V_O$ may be increased or decreased to a predetermined value or more. According to an embodiment, the feedback controller 370 may disconnect at least one of the currently selected switched capacitors according to a change and a change amount in the output voltage $V_O$, and select other switched capacitors to connect to the buck converter 320. For example, when the output voltage $V_O$ becomes greater than a predetermined value, the feedback controller 370 may select the two switched capacitors having a voltage conversion ratio greater than that of the currently selected switched capacitors. For example, when the output voltage $V_O$ becomes less than a predetermined value, the feedback controller 370 may select the two switched capacitors having a voltage conversion ratio less than that of the currently selected switched capacitors.

According to an embodiment, the feedback controller 370 may detect the fluctuation in the load. According to an embodiment, the feedback controller 370 may select the switched capacitor to be connected to the buck converter 320 in response to the fluctuation in the load. For example, when the load rapidly increases, the switched capacitor having the voltage conversion ratio greater than that of the currently selected switched capacitors is selected so that a magnitude in a voltage (e.g., voltage applied across the inductor) applied across the buck converter 320 can be increased. For example, if the load is decreased, the feedback controller 370 may select a switched capacitor having a voltage conversion ratio smaller than those of the currently selected switched capacitors to reduce the voltage applied across the buck converter 320. According to an embodiment, the feedback controller 370 adaptively selects the switched capacitors connected to the buck converter 320 in response to the fluctuation in the load to control the voltage applied across the buck converter 320 (e.g., inductor) and quickly respond to the fluctuation in the load.

Figure 4:
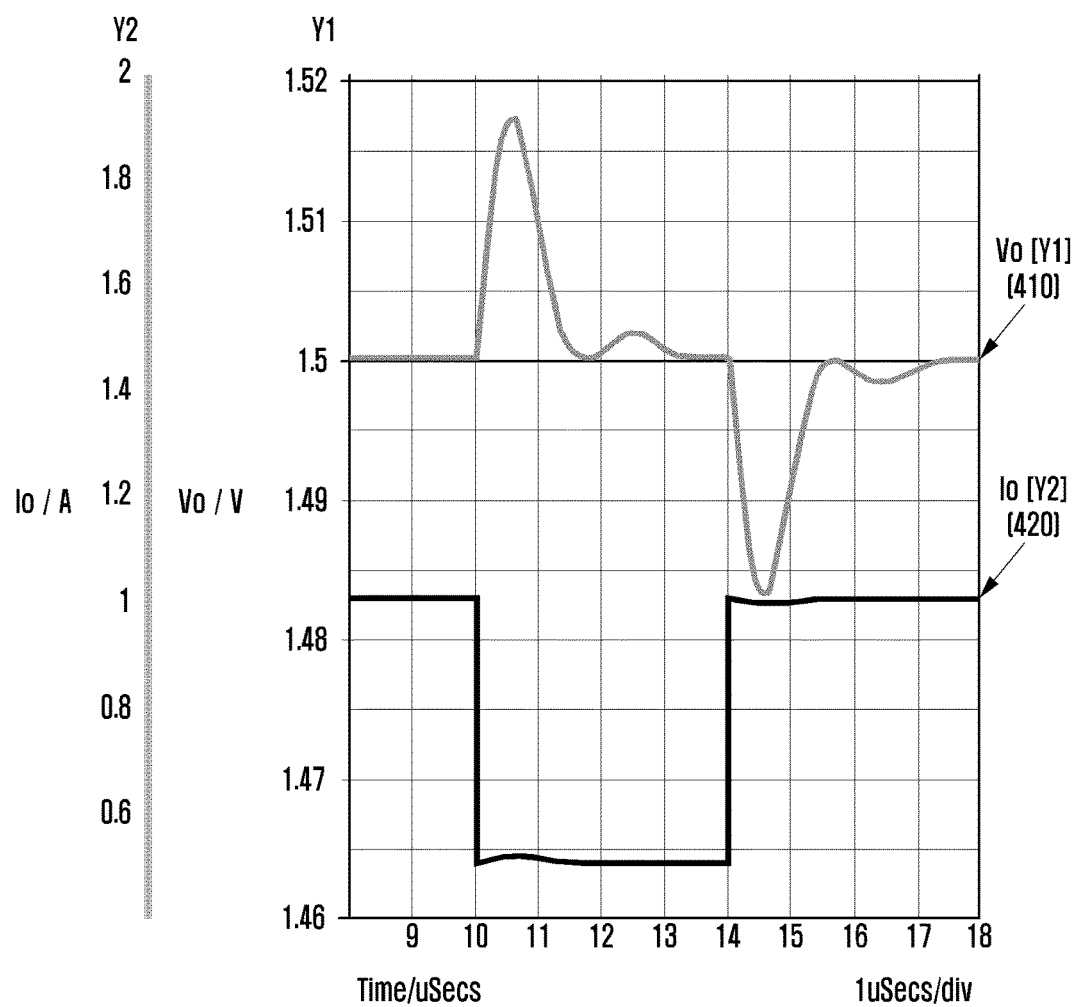
FIG. 4 is a graph illustrating an output current and a voltage value in the voltage converter circuit according to various embodiments of the present disclosure.

FIG. 4 is a graph illustrating an output current and a voltage value in the voltage converter circuit according to various embodiments of the present disclosure.

According to the voltage converter circuit according to various embodiments of the present disclosure, it is possible to efficiently convert the input voltage into the output voltage corresponding to the desired reference output voltage using the plurality of switched capacitors and the buck converter. For example, FIG. 4 illustrates a waveform 410 of the output voltage $V_O$ and a waveform 420 of the output current $I_O$ when the voltage across the inductor is about 0.3V by connecting a switched capacitor having a voltage conversion ratio of 2:1 and a switched capacitor having a voltage conversion ratio of 3:1 to the buck converter in the voltage converter circuit according to an embodiment of the present disclosure, setting the input voltage to be 3.7V, setting the output voltage (reference output voltage) to be 1.5V, and setting the voltage transmitted from each of the switched capacitors to the buck converter to be 1.8V and 1.2V.

When the above conditions are applied, the voltage converter circuit according to various embodiments of the present disclosure can basically drop the input voltage of 3.7V to provide the output voltage $V_O$ of 1.5V. Referring to the output current graph 420, the situation that the output current $I_O$ is sharply reduced from 1 A to 0.5 A in order to simulate the sudden fluctuation in the load at a portion of 10 μsec, and the output current $I_O$ is suddenly increased to 1 A at a portion of 14 μsec again is illustrated.

Referring to the output voltage $V_O$ at the time of the fluctuation in the load (fluctuation in the output current $I_O$), a ripple may occur in the output voltage $V_O$ at the time of the sudden fluctuation in the load. However, the voltage converter circuit according to various embodiments of the present disclosure may relatively stably hold the output voltage $V_O$ at about 1.517V to 1.483V even when the load is suddenly fluctuated. For example, when a single buck converter is used, since the inductance of the buck converter and the voltage applied across the inductor were relatively large, resulting in making the ripple component of the output voltage ($V_O$) due to the fluctuation in the load larger. According to various embodiments of the present disclosure, by reducing the inductance component and the voltage applied across the inductor, the power loss due to the inductance is reduced, the ripple component of the output voltage $V_O$ is reduced, and the output voltage $V_O$ may be controlled more stably.

Figure 5A:
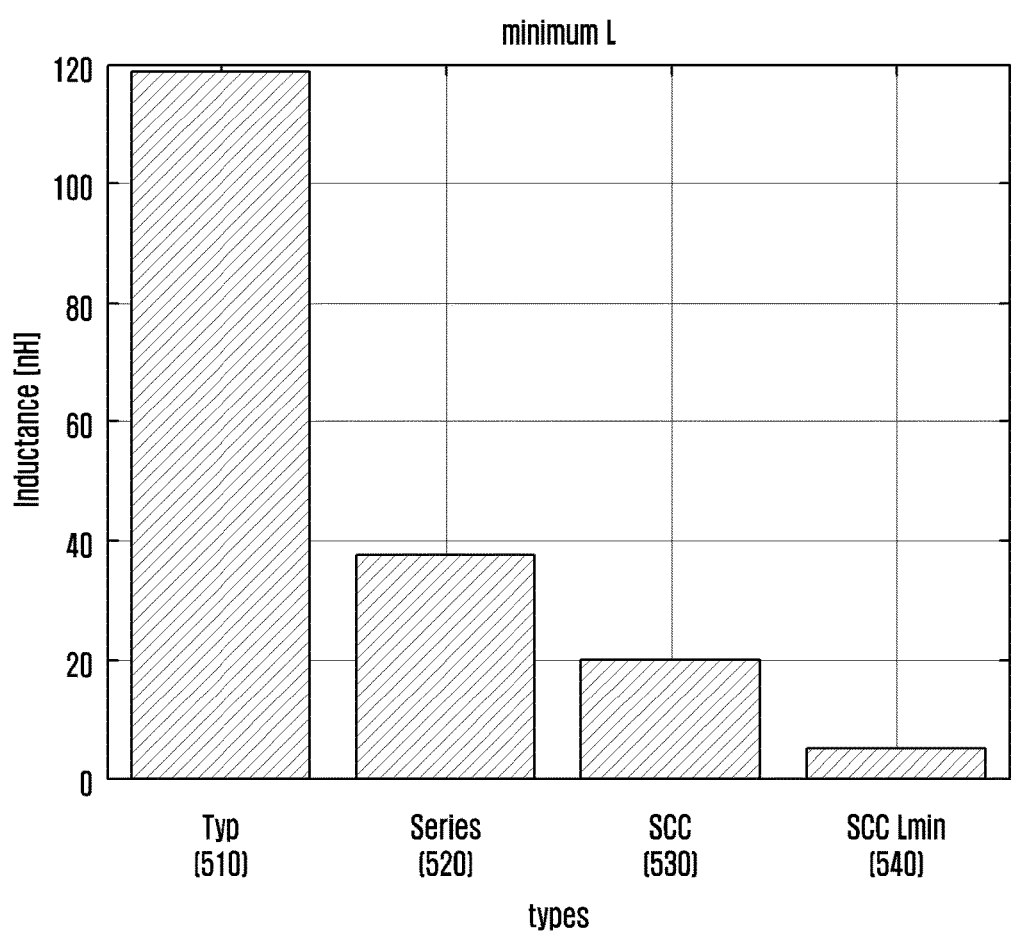
FIGS. 5A and 5B are diagrams illustrating an inductance and a power loss according to various embodiments of the present disclosure.
Figure 5B:
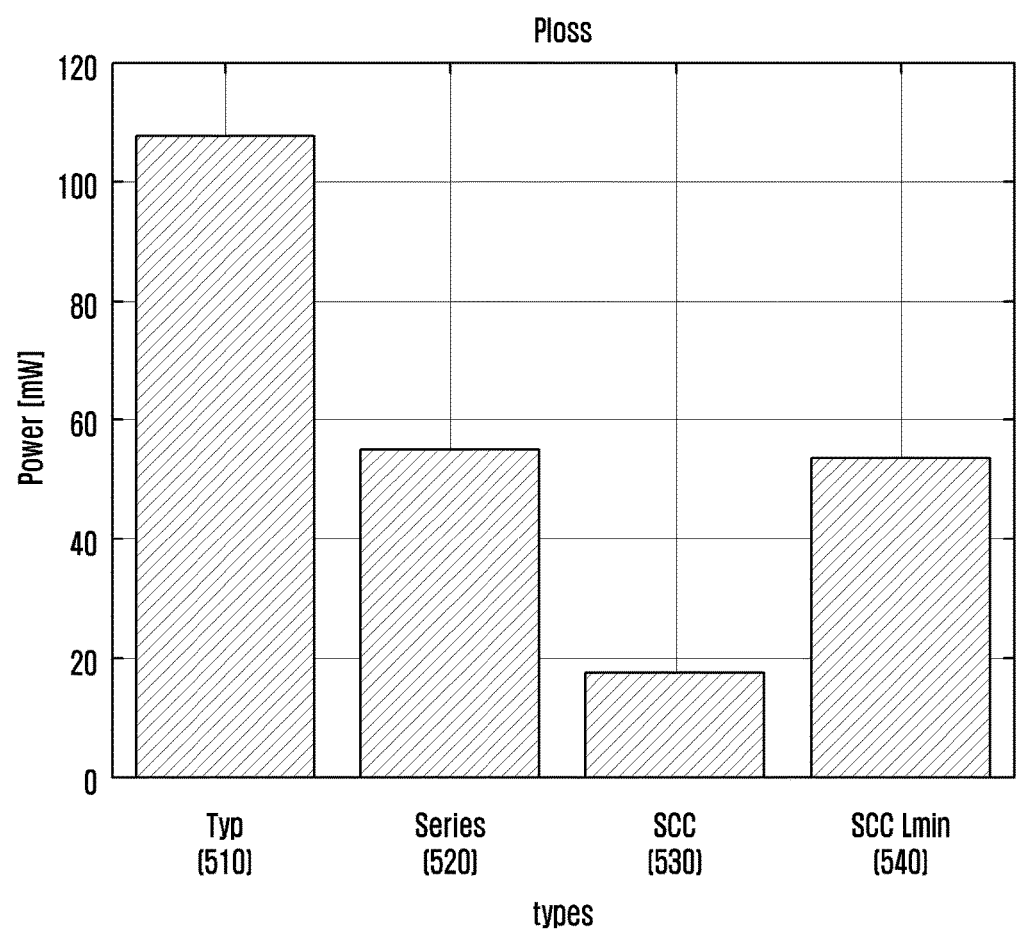

FIGS. 5A and 5B are diagrams illustrating an inductance and a power loss, respectively, according to various embodiments of the present disclosure. For example, FIG. 5A is a graph showing inductance values according to design values shown in the following Table 1, and FIG. 5B is a graph showing power loss amounts according to the design values shown in the following Table 1.

TABLE 1

Main design parameter values

| CASE | 510 Single buck converter (typ) | 520 Single switched capacitor and buck converter (Series) | 530 Two switched capacitors and buck converter (SCC) | 540 Two switched capacitors and buck converter (SCC Lmin) |
|---|---|---|---|---|
| Switching frequency | 1 MHz | 1 MHz | 1 MHz | 3.8 MHz |

\* Common design matter
Input voltage ($V_{IN}$) = 3.7 V, output voltage ($V_O$) = 1.5 V, output current ($I_O$) = 1 A, MOSFET (Buck): FDME1024NZT, output capacitor ($C_O$) = 10 μF, output resistance ($R_C$) = 10 m Ohm, output voltage ripple ($V_{O\_pkpk}$): 1% of $V_O$, output voltage ($V_H$) of first switched capacitor = ½ \* $V_{IN}$, output voltage ($V_L$) of second switched capacitor = ⅓ \* $V_{IN}$ In general, the output voltage switching ripple of the buck converter (e.g., in the case of 510 (typ) in the above Table 1) is given by the following Equation 1.

$$\Delta V_O = \Delta V_{RC} + \Delta V_C = R_C \Delta i_L + \frac{1}{8} \frac{\Delta i_L}{C_O} T_{SW} \quad \text{[Equation 1]}$$

In the above Equation 1, $V_O$ may refer to the output voltage, $i_L$ may refer to the inductor current, $C_O$ may refer to the output capacitor, and $T_{SW}$ may refer to the switching period. In addition, $\Delta V_O$ may refer to the ripple of the output voltage $V_O$, and $\Delta V_{RC}$ may refer to the output voltage ripple component due to the equivalent series resistance (ESR) of the output capacitor and the voltage ripple component of the pure capacitor of the output capacitor. In this case, if the maximum switching ripple specification that the load requires is $\Delta V_{O\_max}$, it should satisfy $\Delta V_O < \Delta V_{O\_max}$.

In a typical converter, $\Delta i_L$ is as the following Equation 2.

$$\Delta i_L = \frac{V_{IN} - V_O}{L} DT_{SW} \quad \text{[Equation 2]}$$

In the above Equation 2, L may refer to the inductance and D may refer to the duty ratio of the buck converter. For example, D may refer to the ratio of on-time and off-time of the high side switch of the buck converter. That is, D is as the following Equation 3.

$$D = \frac{V_O}{V_{IN}} \quad \text{[Equation 3]}$$

If the minimum inductance of the inductor of the buck converter is obtained based on the above Equations 1 to 3, it is as the following Equation 4.

$$L_{typ} > R_C \frac{V_{IN} - V_O}{\Delta V_{O\_max}} \frac{V_O}{V_{IN}} T_{SW} + \frac{1}{8} \frac{V_{IN} - V_O}{\Delta V_{O\_max} C_O} \frac{V_O}{V_{IN}} T_{SW}^2 \quad \text{[Equation 4]}$$

In the above Equation 4, under the assumption that the same output capacitor is used, as only a method for reducing an inductance, there is a method for reducing Tsw, e.g., a method for increasing a switching frequency. However, the method may have a limit due to the switching loss.

For example, the switching loss of the buck converter using the MOSFET element (e.g., in the case of 510 (typ) in the above Table 1) is given by the following Equation 5.

$$P_{loss\_typ} = f_{SW}\{½(2C_{OSS})V_{IN}^2 + ½V_{IN}I_O t_r + Q_g V_G\} \quad \text{[Equation 5]}$$

In the above Equation 5, $C_{OSS}$ may refer to the output capacitor of the high side MOSFET, $t_r$ may refer to the time taken to conduct the MOSFET switch, $Q_g$ may refer to the charge capacity of the gate of the MOSFET, and $V_G$ may refer to the gate driving voltage of the MOSFET. For example, the values of $C_{OSS}$, $t_r$, $Q_g$, and $V_G$ may be defined according to the design requirements or the setting requirements upon the manufacturing of the MOSFET element. For example, the values of $C_{OSS}$, $t_r$, $Q_g$, and $V_G$ may be fixed according to the used MOSFET element. Therefore, in order to increase the switching frequency $f_{SW}$ while maintaining the same power loss level, it is necessary to use a high-performance device or lower $V_{IN}$.

In this aspect, the available method is a method of using a single switched capacitor and a buck converter (e.g., in the case of 520 (series) of the above Table 1) which are connected in series.

In the case of the 520 (Series), the minimum inductance becomes a form in which $V_{IN}$ is replaced with $V_H$ in the above Equation 4, and the loss power becomes a form in which $V_{IN}$ is replaced with $V_H$ in the above Equation 5. That is, in the case of the 520 (Series), the minimum inductance is as the following Equation 6 and the power loss is as the following Equation 7.

$$L_{Series} > R_C \frac{V_H - V_O}{\Delta V_{O\_max}} \frac{V_O}{V_H} T_{SW} + \frac{1}{8} \frac{V_H - V_O}{\Delta V_{O\_max} C_O} \frac{V_O}{V_H} T_{SW}^2 \quad \text{[Equation 6]}$$

$$P_{loss\_Series} = f_{SW}\left\{\frac{1}{2}(2C_{OSS})V_H^2 + \frac{1}{2}V_H I_O t_r + Q_g V_G\right\} \quad \text{[Equation 7]}$$

In the above Equations 6 and 7, $V_H$ may refer to the applied voltage (e.g., the output voltage of the first switched capacitor) instead of $V_{IN}$ when the buck converter is in the switched on state. In the case of the 520, when the buck converter is in the switched off state, the ground voltage is applied to the input of the buck converter like the buck converter of the typical 510 (typ).

In the case of the 520 (Series), as $V_H$ approaches the output voltage $V_O$, the minimum inductance value may be getting smaller, but when $V_H$ is less than $V_O$, the normal operation becomes impossible, and therefore the $V_H$ needs to be determined in consideration of the error of the elements configuring the circuit, the voltage drop upon the circuit conduction, or the like. Therefore, in order to configure an actual circuit, $V_H$ needs to be determined, having a certain margin. In the case of the 520 (Series), the output voltage $V_H$ of the switched capacitor less than the $V_{IN}$ is input to the buck converter to be able to reduce the inductance and reduce the power loss amount. However, as described above, there may be a limitation in lowering the $V_H$ value in configuring the actual circuit.

In accordance with various embodiments of the present disclosure, $\Delta i_L$ of the voltage converter circuit (e.g., in the case of 530 (SCC) and 540 (SCC Lmin) of the above Table 1) which connects the two switched capacitors to the buck converter is represented by the following Equation 8.

$$\Delta i_L = \frac{V_H - V_O}{L} D_{SCC} T_{SW} \qquad \text{[Equation 8]}$$

In the above Equation 8, the duty ratio $D_{SCC}$ is as the following Equation 9.

$$D_{SCC} = \frac{V_O - V_L}{V_H - V_L} \qquad \text{[Equation 9]}$$

In the above Equation 9, when the buck converter is in the switched on state, $V_H$ may refer to the voltage applied instead of $V_{IN}$, and $V_L$ may refer to the voltage applied instead of the ground when the buck converter is in the switched off state. That is, $V_H$ may refer to the output voltage of the first switched capacitor input to the buck converter and $V_L$ may refer to the output voltage of the second switched capacitor input to the buck converter.

If the minimum inductance $L_{SCC}$ and the switching loss $P_{loss\_SCC}$ of the voltage converter circuit using the two switched capacitors and the buck converter are obtained based on the above Equations 5 to 9, they each may be obtained by the following Equations 10 and 11.

$$L_{SCC} > \qquad \text{[Equation 10]}$$
$$R_C \frac{V_H - V_O}{\Delta V_{O\_max}} \frac{V_O - V_L}{V_H - V_L} T_{SW} + \frac{1}{8} \frac{V_H - V_O}{\Delta V_{O\_max} C_O} \frac{V_O - V_L}{V_H - V_L} T_{SW}^2$$

$$P_{loss\_SCC} = \qquad \text{[Equation 11]}$$
$$f_{SW} \left\{ \frac{1}{2}(C_{OSS} + C_t)(V_H - V_L)^2 + \frac{1}{2}(V_H - V_L)I_o t_r + Q_g V_G \right\}$$

Referring to FIG. 5A, the minimum inductance values are shown to have the same inductor current ripple for each method according to the above Equations 1 to 11 and Table 1. For example, comparing the minimum inductance value to obtain the same operating effect (the degree of the output ripple), in the case of the 510 (typ), an inductance of approximately 119 nH is required, but in the case of 520 (Series), inductance of approximately 38 nH is required and in the case of 530 (SCC), inductance of approximately 20 nH is required. That is, in the case of the voltage converter circuit using the two switched capacitors and the buck converter according to various embodiments of the present disclosure, the inductance value required to obtain the same operating effect may be certainly reduced to be a level of 16% than the case of the 510 (typ). In addition, it is possible to more reduce the required inductance value than the case of the 520 (Series) in which the single switched capacitor and the buck converter are connected in series to each other.

Referring to FIG. 5B, under the same condition, the power loss (Ploss) is about 110 mW in the case of the 510 (typ), whereas the power loss of about 55 mW may occur in the case of the 520 (Series) and the power loss may be certainly reduced to be about 17 mW in the case of the 530 (SCC).

The voltage converter circuit including the two switched capacitors and the buck converter according to various embodiments of the present disclosure can perform the high-efficiency voltage conversion with the small power loss only by the relatively smaller inductance value and reduce the circuit size and the design costs due to the use of the inductor as the required inductance value is reduced.

According to an embodiment, it is possible to further reduce the required minimum inductance value instead of increasing the power loss when the voltage converter circuit using the two switched capacitors and the buck converter sets the switching frequency to be high (e.g., in the case of 540 (SCC Lmin)). For example, FIGS. 5A and 5B illustrate that the 540 (SCC Lmin) increases the switching frequency until the power loss of the same level as the case of the 520 (Series) occurs. For example, 540 represents the case in which the voltage converter circuit including the two switched capacitors and the buck converter increases the switching frequency by about 3.8 times like 530. In this case, the power loss smaller than the 510 and similar to the 520 occurs, but the required minimum inductance value may be further reduced to approximately 5.3 nH due to the high switching frequency.

According to various embodiments of the present disclosure, it is possible to provide the high-efficiency voltage converter circuit which can reduce the power loss and the required inductance based on the setting and be set to meet the required conditions by appropriately adjusting the power loss amount and the required inductance value.

Figure 6:
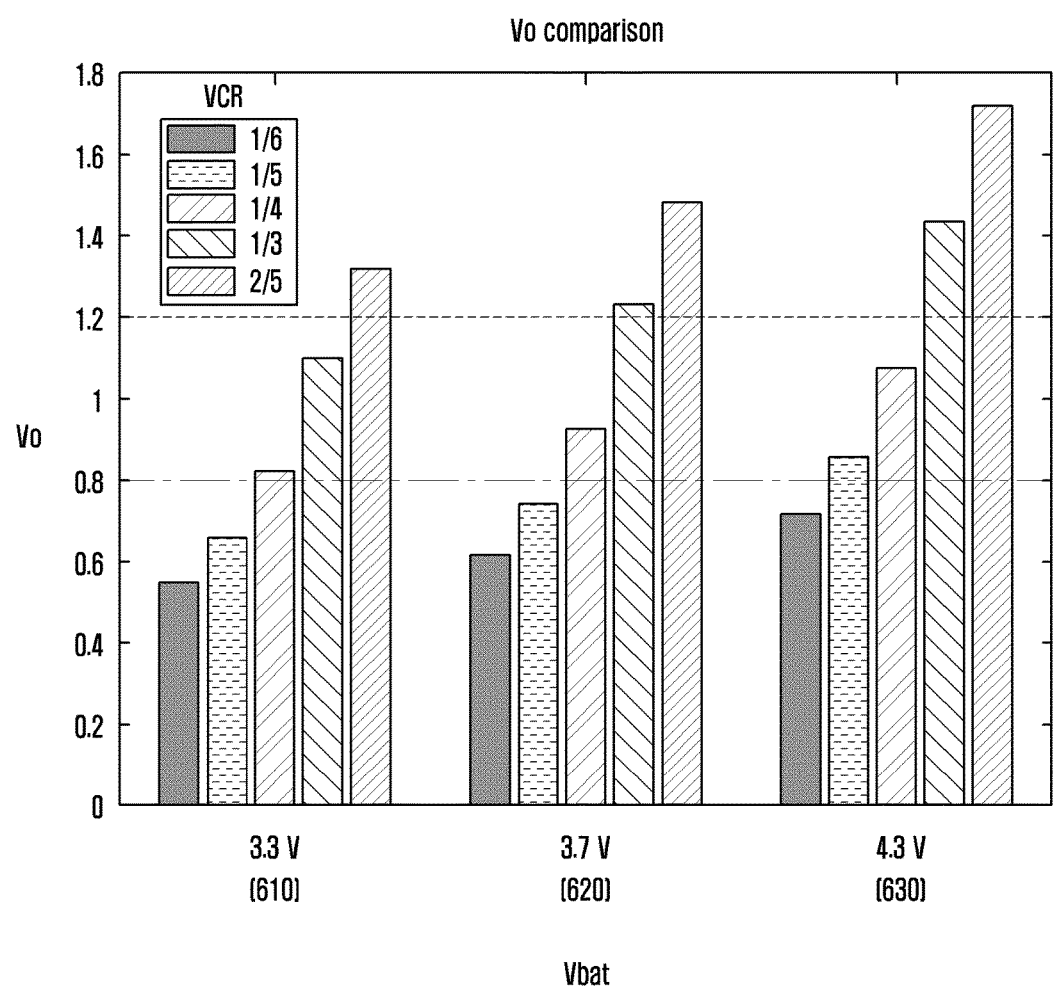
FIG. 6 is a diagram illustrating an operation of the voltage converter circuit according to various embodiments of the present disclosure.

FIG. 6 is a diagram illustrating an operation of the voltage converter circuit according to various embodiments of the present disclosure.

The voltage converter circuit according to various embodiments of the present disclosure may be applied to various electronic devices and internal modules of electronic devices. According to an embodiment, the voltage converter circuit may be applied to an electronic device that supports a fast charge function to reduce the stress of the buck converter during the fast charging. According to an embodiment, the voltage converter circuit is applied to the electronic device using the lithium ion battery to provide the high-efficiency voltage conversion, reduce the inductor (inductance), and provide the high-efficient, high-integration system. According to an embodiment, the voltage converter circuit may be applied to a PMIC or the like of the electronic device and thus may replace a voltage drop circuit having a large reduction ratio.

According to an embodiment, the voltage converter circuit may be applied to a dynamic voltage frequency scaling (DVFS) system requiring a variable power supply.

For example, in a DVFS system, the voltage converter circuit may operate the switched capacitor in which a product of a voltage conversion ration (VCR) by the voltage of the battery is smaller than the output voltage and the switched capacitor in which a product of the voltage conversion ratio by the voltage of the battery is smaller than the output voltage, among the plurality of switched capacitors. For example, the voltage converter circuit may convert the input voltage supplied from the battery of the electronic device into the output voltage required by the processor (e.g., application processor (AP)) of the electronic device and output the output voltage.

For example, FIG. 6 illustrates the output voltage depending on the voltage conversion ratio of each of the plurality of switched capacitors in the case in which the voltage of the battery of the electronic device varies from 3.3V to 4.3V and the required voltage of the processor is 0.8V to 1.2V.

For example, it is assumed that the voltage converter circuit includes switched capacitors each having the voltage conversion ratio of 1/6, 1/5, 1/4, 1/3, and 2/5. For example, if the battery voltage is 3.3V (in the case of 610), each switched capacitors may output 0.55V, 0.66V, 0.825V, 1.1V, and 1.32V depending on each of the voltage conversion ratios. For example, if the battery voltage is 3.7V (in the case of 620), each switched capacitors may output about 0.62V, 0.74V, 0.925V, 1.23V, and 1.48V depending on each of the voltage conversion ratios. For example, if the battery voltage is 4.3V (in the case of 630), each switched capacitors may output about 0.72V, 0.86V, 1.075V, 1.43V, and 1.72V depending on each of the voltage conversion ratios.

According to an embodiment, the voltage converter circuit selects the two switched capacitors to be connected to the buck converter from among the plurality of switched capacitors in consideration of the voltage of the battery (e.g., the input voltage) and the voltage (e.g., the output voltage) required by the processor. For example, if the voltage of the battery is 3.3V and the voltage required by the processor is 0.8V, then the voltage converter circuit may select a switched capacitor with a 1/5 VCR and a switched capacitor with a 1/4 VCR (or 1/3 VCR in consideration of a margin) and may connect the selected switched capacitor to the high side input and the low side input of the buck converter. For example, if the voltage of the battery is 4.3V and the voltage required by the processor is 1.2V, the voltage converter circuit may select the switched capacitor with the 1/4 VCR and the switched capacitor with the 1/3 VCR and connect the selected switched capacitor to the high side input and the low side input of the buck converter.

According to an embodiment, the voltage converter circuit may adaptively select the switched capacitor in consideration of the input voltage or the output voltage and connect the selected switched capacitor to the buck converter depending on the condition, thereby adaptively providing the high-efficiency voltage conversion. According to an embodiment, since the voltage converter circuit includes the plurality of switched capacitors but may substantially reduce the voltage applied across both terminals of the buck converter (e.g., an inductor) and reduce the inductance, the voltage converter circuit may reduce the size of the inductor with low integration and provide the high-efficiency voltage conversion function without substantially increasing the size of the circuit using the plurality of switched capacitors with high integration.

Figure 7:
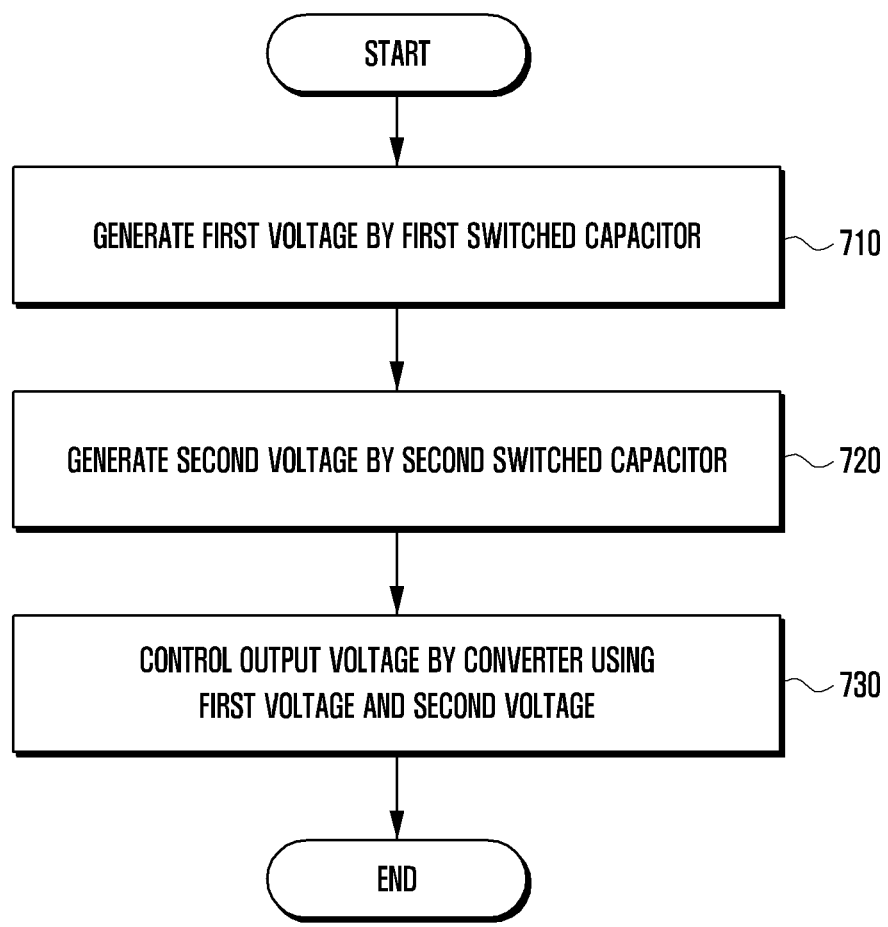
FIG. 7 is a flowchart illustrating a voltage conversion method according to various embodiments of the present disclosure.

FIG. 7 is a flowchart illustrating a voltage conversion method of a voltage converter circuit according to various embodiments of the present disclosure. According to an embodiment, the electronic device may include the first switched capacitor (e.g., SC1 in FIGS. 2A and 2B, 311 in FIG. 3), the second switched capacitor (e.g., SC2 in FIGS. 2A and 2B, 312 in FIG. 3), and the converter, for example, a buck converter (e.g., 230 of FIG. 2A, 260 of FIG. 2B, 320 of FIG. 3). According to an embodiment, the first switched capacitor and the second switched capacitor may be electrically connected to the converter.

In operation 710, the first switched capacitor (e.g., SC1 in FIGS. 2A and 2B, 311 in FIG. 3) may generate a first voltage. For example, the first switched capacitor may convert the applied input voltage to generate the first voltage. The first switched capacitor may apply the first voltage to the converter. According to an embodiment, the first switched capacitor may provide the generated first voltage as the high side input of the converter. According to an embodiment, the first voltage generated by the first switched capacitor may be set to be larger than the magnitude of the second voltage generated by the second switched capacitor.

In operation 720, the second switched capacitor (e.g., SC2 in FIGS. 2A and 2B, 312 in FIG. 3) may generate a second voltage. For example, the second switched capacitor may convert the applied input voltage to generate the second voltage. The second switched capacitor may apply the second voltage to the converter. According to an embodiment, the second switched capacitor may provide the generated second voltage as the low side input of the converter.

In operation 730, the converter (e.g., 230 in FIG. 2A, 260 in FIG. 2B, 320 in FIG. 3) may control the output voltage using the first voltage and the second voltage. According to an embodiment, the converter may include the buck converter. According to an embodiment, the converter may alternately receive the first voltage and the second voltage. For example, the converter may alternately receive the first voltage and the second voltage as the high side input and the low side input, respectively. According to an embodiment, the converter may convert the first voltage and the second voltage, which are alternately applied, into the set output voltage and output the output voltage.

According to an embodiment, the first voltage and the second voltage may have the set output voltage and the value within the set range. According to the embodiments of the present disclosure, the difference between the first voltage or the second voltage applied to the converter and the output voltage of the converter may be reduced, such that the size of the inductor (inductance) in the converter may be reduced and the switching loss may be minimized.

Figure 8:
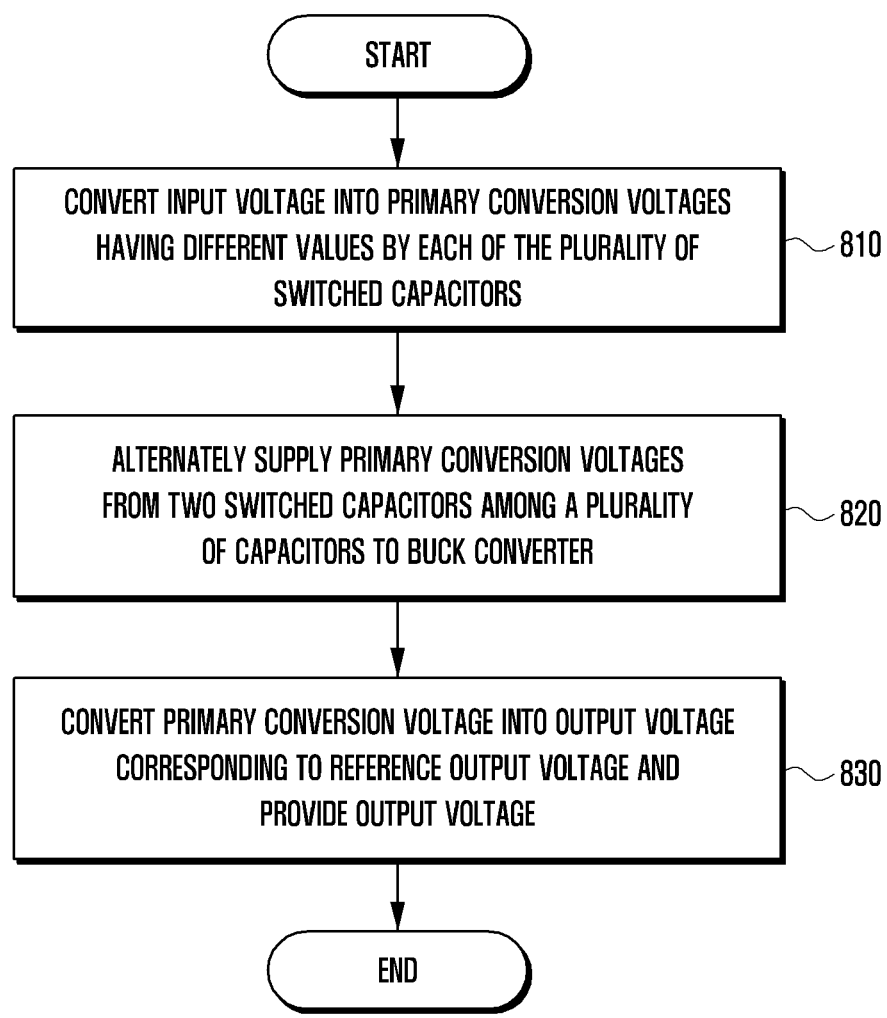
FIG. 8 is a flowchart illustrating a voltage conversion method according to various embodiments of the present disclosure.

FIG. 8 is a flowchart illustrating a voltage conversion method of a voltage converter circuit according to various embodiments of the present disclosure. According to an embodiment, the voltage converter circuit includes a plurality of switched capacitors (e.g., 220 in FIG. 2A, 250 in FIG. 2B, 311, 312, . . . , 31n in FIG. 3) having different voltage conversion ratios and a converter (e.g., 230 in FIG. 2A, 260 in FIG. 2B, 320 in FIG. 3). According to an embodiment, the converter (e.g., 230 in FIG. 2A, 260 in FIG. 2B, 320 in FIG. 3) may include the buck converter. According to an embodiment, in the voltage converter circuit, each of the plurality of switched capacitors (e.g., 220 in FIG. 2A, 250 in FIG. 2B, 311, 312, . . . , 31n in FIG. 3) may be selectively connected to the converter (e.g., 230 in FIG. 2A, 260 in FIG. 2B, 320 in FIG. 3). For example, the voltage converter circuit may sequentially convert the input voltage using the switched capacitors (e.g., 220 in FIG. 2A, 250 in FIG. 2B, 311, 312, . . . , 31n in FIG. 3) and the converter (e.g., 230 in FIG. 2A, 260 in FIG. 2B, 320 in FIG. 3).

In operation 810, the voltage converter circuit (e.g., each of the plurality of switched capacitors (e.g., SC1 and SC2 in FIGS. 2A and 2B, 311, 312, . . . , 31n in FIG. 3)) may convert the input voltage into voltages having different values. According to an embodiment, each of the plurality of switched capacitors (e.g., SC1 and SC2 in FIGS. 2A and 2B, 311, 312, . . . , 31n in FIG. 3) may be supplied with the input voltage from the power supply (e.g., 211 in FIGS. 2A and 2B, $V_{IN}$ in FIG. 3). For example, each of the plurality of switched capacitors (e.g., SC1 and SC2 in FIGS. 2A and 2B, 311, 312, . . . , 31n in FIG. 3) may be supplied with the input voltage from the battery of the electronic device. For example, the input voltage may be input (applied) to each of the plurality of switched capacitors (e.g., SC1 and SC2 in FIGS. 2A and 2B, 311, 312, . . . , 31n in FIG. 3).

According to an embodiment, each of the plurality of switched capacitors (e.g., SC1 and SC2 in FIGS. 2A and 2B, 311, 312, . . . , 31*n* in FIG. 3) may convert and output the applied input voltage depending on the voltage conversion ratio. The voltage that each of the plurality of switched capacitors (e.g., SC1 and SC2 in FIGS. 2A and 2B, 311, 312, . . . , 31*n* in FIG. 3) output may be a voltage greater than the ground. According to an embodiment, each of the plurality of switched capacitors (e.g., SC1 and SC2 in FIGS. 2A and 2B, 311, 312, . . . , 31*n* in FIG. 3) may convert the input voltage into the set reference output voltage or the voltage within the set range from the output voltage and output the voltage.

In operation 820, the voltage conversion circuit may alternate the first voltage and the second voltage output from each of the two selected switched capacitors of the plurality of switched capacitors (e.g., SC1 and SC2 of FIGS. 2A and 2B, 311, 312, . . . , 31*n* in FIG. 3) and apply the alternated voltage to the converter (e.g., 230 in FIG. 2A, 260 in FIG. 2B, 320 in FIG. 3).

According to an embodiment, the voltage converter circuit may alternately apply the first voltage greater than the reference output voltage and the second voltage smaller than the reference output voltage from each of the two switched capacitors to the converter (e.g., 230 in FIG. 2A, 260 in FIG. 2B, 320 in FIG. 3). For example, the reference output voltage may be the voltage value that is ultimately set to be obtained through the voltage converter circuit.

For example, one of the two selected switched capacitors may output the first voltage greater than the reference output voltage and the other one may output the second voltage smaller than the reference output voltage. According to an embodiment, the first voltage greater than the reference output voltage may be applied to the high side input of the converter (e.g., 230 in FIG. 2A, 260 in FIG. 2B, 320 in FIG. 3) (e.g., buck converter), and the second voltage smaller than the reference output voltage may be applied to the low side input of the converter. For example, if the two capacitors may alternately apply the first voltage greater than the reference output voltage and the second voltage smaller than the reference output voltage to the converter (e.g., 230 in FIG. 2A, 260 in FIG. 2B, 320 in FIG. 3).

In operation 830, the voltage converter circuit (e.g., converter (e.g., 230 in FIG. 2A, 260 in FIG. 2B, 320 in FIG. 3)) converts the first voltage and the second voltage alternately applied from the two switched capacitors into the output voltage corresponding to the reference output voltage and provide (output) the output voltage. For example, the reference output voltage may be the voltage that is ultimately set for the voltage converter circuit to output.

According to an embodiment, the voltage conversion method may further include an operation of measuring the input voltage; and an operation of selecting the two switched capacitors outputting the voltage applied to the converter (e.g., 230 in FIG. 2A, 260 in FIG. 2B, 320 in FIG. 3) based on the voltage conversion ration of each of the plurality of capacitors and the input voltage (e.g., 311, 312, . . . , 31*n* in FIG. 3). For example, the voltage converter circuit (e.g., feedback controller (e.g., 370 in FIG. 3)) may select one switched capacitor outputting the voltage having the slightest difference from the reference output voltage among the switched capacitors outputting the voltage greater than the reference output voltage and select one switched capacitor outputting the voltage having the slightest difference from the reference output voltage among the switched capacitors outputting the voltage smaller than the reference output voltage. For example, the voltage converter circuit (e.g., feedback controller (e.g., 370 in FIG. 3)) selects the switched capacitors, which output the slightly larger voltage than the reference output voltage and the slighter smaller voltage than the reference output voltage, one by one to control the voltage applied to the converter (e.g., 230 in FIG. 2A, 260 in FIG. 2B, 320 in FIG. 3) (e.g., buck converter). For example, the voltage converter circuit may control the voltage applied to the converter (e.g., 230 in FIG. 2A, 260 in FIG. 2*b*, 320 in FIG. 3)) to minimize the voltage applied across (e.g., an input terminal and an output terminal of the buck converter (e.g., 230 in FIG. 2A, 260 in FIG. 2B, 320 in FIG. 3)) the converter (e.g., 230 in FIG. 2A, 260 in FIG. 2B, 320 in FIG. 3) and reduce the loss power (e.g., switching loss).

According to an embodiment, the voltage conversion method may further include an operation of measuring the output voltage and an operation of selecting the two switched capacitors outputting the voltage to be applied to the converter (e.g., 230 in FIG. 2A, 260 in FIG. 2B, 320 in FIG. 3) based on the difference between the output voltage and the reference output voltage. According to an embodiment, the voltage converter circuit (e.g., feedback controller 370 in FIG. 3) disconnects at least one of the currently selected switched capacitors depending on the change and the change amount in the output voltage, and selects other switched capacitors and connect the selected switched capacitors to the buck converter (e.g., 230 in FIG. 2A, 260 in FIG. 2B, 320 in FIG. 3). For example, when the output voltage is greater than the reference output voltage by a certain value, the voltage converter circuit (e.g., feedback controller (e.g., 370 in FIG. 3)) may select the two switched capacitors having the voltage conversion ratio greater than that of the currently selected switched capacitors. For example, when the output voltage is smaller than the reference output voltage by a certain value, the voltage converter circuit (e.g., feedback controller (e.g., 370 in FIG. 3)) may select the two switched capacitors having the voltage conversion ratio smaller than that of the currently selected switched capacitors.

According to various embodiments, the order of the operations of the voltage conversion method is not limited to the above description, and may be variously changed according to the embodiments, and at least one operation may be performed at the same time. For example, the operation of selecting the two switched capacitors outputting the voltage to be applied to the converter (e.g., buck converter) may be performed prior to the operation 810, between the operations 810 and 820, between the operations 820 and 830, or after the operation 830. For example, the voltage converter circuit may measure the input voltage and the output voltage continuously or periodically during the operations 810 to 830.

A term "module" used in the present disclosure may refer, for example, to a unit including at least one of, for example, hardware, software, or firmware or any combination thereof. The "module" may be interchangeably used with a term such as a unit, logic, a logical block, a component, or a circuit. The "module" may be a minimum unit or a portion of an integrally formed component. The "module" may be a minimum unit or a portion that performs at least one function. The "module" may be mechanically or electronically implemented. For example, a "module" according to an example embodiment of the present disclosure may include, for example, and without limitation, at least one of a dedicated processor, a CPU, an Application-Specific Integrated Circuit (ASIC) chip, Field-Programmable Gate Arrays (FPGAs), or a programmable-logic device, or the like, that performs any operation known or to be developed.

According to various example embodiments, at least a portion of a method (e.g., operations) or a device (e.g., modules or functions thereof) according to the present disclosure may be implemented with an instruction stored at computer-readable storage media in a form of, for example, a programming module. When the instruction is executed by at least one processor (e.g., the processor 120), the at least one processor may perform a function corresponding to the instruction. The computer-readable storage media may be, for example, the memory 130. At least a portion of the programming module may be implemented (e.g., executed) by, for example, the processor 120. At least a portion of the programming module may include, for example, a module, a program, a routine, sets of instructions, or a process that performs at least one function.

The computer-readable storage media may include magnetic media such as a hard disk, floppy disk, and magnetic tape, optical media such as a Compact Disc Read Only memory (CD-ROM) and a Digital Versatile Disc (DVD), magneto-optical media such as a floptical disk, and a hardware device, specially formed to store and perform a program instruction (e.g., a programming module), such as a Read Only memory (ROM), a Random Access memory (RAM), a flash memory. Further, a program instruction may include a high-level language code that may be executed by a computer using an interpreter as well as a machine language code generated by a compiler. In order to perform operation of the present disclosure, the above-described hardware device may be formed to operate as at least one software module, and vice versa.

A module or a programming module according to the present disclosure may include at least one of the foregoing elements, may omit some elements, or may further include additional other elements. Operations performed by a module, a programming module, or another element according to the present disclosure may be executed with a sequential, parallel, repeated, or heuristic method. Further, some operations may be executed in different orders, may be omitted, or may add other operations.

Although the example embodiments of the present disclosure have been illustrated in the present disclosure and the accompanying drawings and specific terms have been used, they are used in a general meaning in order to aid in the understanding the present disclosure and do not limit the scope of the present disclosure. It will be apparent to those skilled in the art to which the present disclosure pertains that various modifications may be made without departing from the scope of the present disclosure, in addition to the example embodiments disclosed herein.

What is claimed is:

1. A voltage converter circuit, comprising:
   a plurality of switched capacitors; and
   a buck converter comprising an inductor and a capacitor, the buck converter configured to be alternately supplied with a first voltage and a second voltage output from each of two switched capacitors selected from the plurality of switched capacitors, to convert the supplied first voltage or second voltage into an output voltage via an LC filter and to provide the output voltage; and
   a feedback controller configured to select the two switched capacitors for outputting the voltage supplied to the buck converter from among the plurality of switched capacitors,
   wherein output terminals of each of the plurality of switched capacitors are selectively electrically connected to an input terminal of the buck converter.

2. The voltage converter circuit of claim 1, wherein each of the plurality of switched capacitors has a different voltage conversion ratio.

3. The voltage converter circuit of claim 1, wherein one of the first voltage and the second voltage output from respective ones of the two switched capacitors is provided as a high side input of the buck converter, and another one of the first voltage and the second voltage output from respective ones of the two switched capacitors is provided as a low side input of the buck converter.

4. The voltage converter circuit of claim 1, wherein each of the plurality of switched capacitors is configured to convert an input voltage into a voltage within a set range from a reference output voltage, and to output the voltage.

5. The voltage converter circuit of claim 1, wherein one of the first voltage and the second voltage output from respective ones of the two switched capacitors is provided as a high side input of the buck converter, and another one of the first voltage and the second voltage output from respective ones of the two switched capacitors is provided as a low side input of the buck converter.

6. The voltage converter circuit of claim 1, wherein the feedback controller is configured to measure an input voltage supplied to the plurality of switched capacitors and to select the two switched capacitors based on the input voltage and voltage conversion ratios of each of the plurality of switched capacitors.

7. The voltage converter circuit of claim 6, wherein the feedback controller is configured to select one switched capacitor outputting a voltage having a least difference from a reference output voltage from among the switched capacitors which are configured convert the input voltage into a voltage greater than the reference output voltage based on the input voltage and the voltage conversion ratio, and to output the voltage, and
   to select one switched capacitor outputting a voltage having the a least difference from the reference output voltage from among the switched capacitors configured to convert the input voltage into a voltage less than the reference output voltage, and to output the voltage.

8. The voltage converter circuit of claim 1, wherein the feedback controller is configured to measure the output voltage and to select the two switched capacitors based on a difference between the output voltage and a reference output voltage.

9. The voltage converter circuit of claim 1, wherein the feedback controller is configured to measure the input voltage applied to the plurality of switched capacitors and to select the two switched capacitors based on a preset table based on an input voltage and a voltage conversion ratio.

10. An electronic device, comprising:
   a first switched capacitor configured to generate a first voltage;
   a second switched capacitor configured to generate a second voltage;
   a converter comprising an inductor and a capacitor, the converter configured to be electrically connected to the first switched capacitor and the second switched capacitor;
   a third switched capacitor configured to generate a third voltage; and
   a feedback controller configured to select a switched capacitor for providing a voltage to the converter based on an input voltage applied to the first switched capacitor, the second switched capacitor, and the third switched capacitor, the output voltage, and the first voltage, the second voltage and the third voltage, wherein the converter is configured to control an output voltage of the converter via an LC filter using the first voltage and the second voltage.

11. The electronic device of claim 10, wherein the converter includes a buck converter.

12. The electronic device of claim 11, wherein the first voltage is provided as a high side input of the buck converter, and the second voltage is provided as a low side input of the buck converter.

13. The electronic device of claim 10, wherein a magnitude of the first voltage is greater than a magnitude of the second voltage.

14. A voltage conversion method of a voltage converter circuit including a plurality of switched capacitors, each having different voltage conversion ratios, and a buck converter comprising an inductor and a capacitor, the method comprising:

converting, by each of the plurality of switched capacitors, an input voltage into a voltage having different respective values;

alternately applying a first voltage and a second voltage output from each of two switched capacitors selected from the plurality of switched capacitors to the buck converter; and converting the applied first voltage or second voltage into an output voltage corresponding to a reference output voltage by the buck converter via an LC filter;

outputting the output voltage;

measuring the outputted voltage; and selecting two switched capacitors based on a difference between the outputted voltage and the reference output voltage.

15. The method of claim 14, wherein in the converting into the voltage having different values, the input voltage is converted into a voltage within a set range of the reference output voltage by each of the plurality of switched capacitors.

16. The method of claim 14, wherein the first voltage is a voltage greater than the reference output voltage and the second voltage is a voltage less than the reference output voltage.

17. The method of claim 14, further comprising:

measuring the input voltage; and selecting the two switched capacitors based on the input voltage and the voltage conversion ratios of each of the plurality of switched capacitors.

* * * * *